(12) United States Patent
Shishime et al.

(10) Patent No.: US 10,859,030 B2
(45) Date of Patent: Dec. 8, 2020

(54) CONTROL DEVICE FOR ENGINE

(71) Applicant: Mazda Motor Corporation, Hiroshima (JP)

(72) Inventors: Kouji Shishime, Aki-gun (JP); Takashi Kohata, Aki-gun (JP); Hidetoshi Hashimoto, Aki-gun (JP); Taiki Maiguma, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/775,544

(22) Filed: Jan. 29, 2020

(65) Prior Publication Data

US 2020/0325843 A1 Oct. 15, 2020

(30) Foreign Application Priority Data

Apr. 10, 2019 (JP) ................................ 2019-074810

(51) Int. Cl.
*F02P 5/152* (2006.01)
*F02D 43/04* (2006.01)
(Continued)

(52) U.S. Cl.
CPC ............ *F02D 43/04* (2013.01); *F02D 37/02* (2013.01); *F02D 41/3005* (2013.01); *F02P 5/153* (2013.01); *F02P 5/1521* (2013.01); *F02P 5/1522* (2013.01); *F02P 5/1523* (2013.01); *G01M 15/12* (2013.01); *F02D 2200/024* (2013.01); *F02D 2200/101* (2013.01)

(58) Field of Classification Search
CPC ......... F02D 37/02; F02P 5/152; F02P 5/1521; F02P 5/1522; F02P 5/1523

USPC ........... 123/406.21, 406.29, 406.38, 406.39, 123/406.47; 701/111
See application file for complete search history.

(56) References Cited

U.S. PATENT DOCUMENTS 4,269,154 A * 5/1981 Iwata .................... F02P 5/1523
123/406.35
4,274,379 A * 6/1981 Iwata ...................... F02P 5/152
123/406.39

(Continued)

FOREIGN PATENT DOCUMENTS

JP 2008291758 A 12/2008

*Primary Examiner* — Erick R Solis
(74) *Attorney, Agent, or Firm* — Alleman Hall Creasman & Tuttle LLP

(57) ABSTRACT

A control device for an engine is provided, which includes a knock intensity sensor configured to detect a knock intensity, an output adjustment mechanism configured to adjust an engine output torque, and a controller configured to control the output adjustment mechanism based on the knock intensity. The controller executes a first control in which the output adjustment mechanism is controlled to reduce the knock intensity when the number of strong knocks that is the number of times the knock intensity becomes a second determination intensity or greater is a given determination number or less and when the knock intensity is greater than a first determination intensity, and executes a second control in which the output adjustment mechanism is controlled to reduce the maximum torque more than when the number of strong knocks is the determination number or less, when the number of strong knocks is greater than the determination number.

9 Claims, 15 Drawing Sheets

(51) Int. Cl.
    *F02D 41/30*     (2006.01)
    *G01M 15/12*     (2006.01)
    *F02P 5/153*     (2006.01)
    *F02D 37/02*     (2006.01)

(56) References Cited

U.S. PATENT DOCUMENTS

| | | | | |
|---|---|---|---|---|
| 4,300,503 | A | * | 11/1981 | Deleris ................. F02P 5/1522 123/406.21 |
| 4,549,514 | A | * | 10/1985 | Abe ...................... F02P 5/1523 123/406.39 |
| 4,631,680 | A | * | 12/1986 | Korb ..................... F02P 5/1523 701/105 |
| 4,658,789 | A | * | 4/1987 | Morita .................. F02P 5/1521 123/406.36 |
| 5,668,727 | A | * | 9/1997 | Pellerito ............. F02D 41/0225 701/105 |
| 5,778,662 | A | * | 7/1998 | Mori ....................... F01N 3/22 60/274 |
| 5,806,489 | A | * | 9/1998 | Rouphael ............. F02P 5/1523 123/406.39 |
| 8,327,826 | B2 | * | 12/2012 | Okoshi .................. F02P 5/152 123/406.23 |
| 2003/0005749 | A1 | * | 1/2003 | Nishimura ............ G01L 23/225 73/35.01 |
| 2006/0288982 | A1 | * | 12/2006 | Kaneko ................ G01L 23/225 123/406.39 |
| 2007/0016387 | A1 | * | 1/2007 | Takemura ............ G01L 23/225 702/185 |
| 2009/0276147 | A1 | * | 11/2009 | Hamama ............... F02D 41/008 701/111 |

* cited by examiner

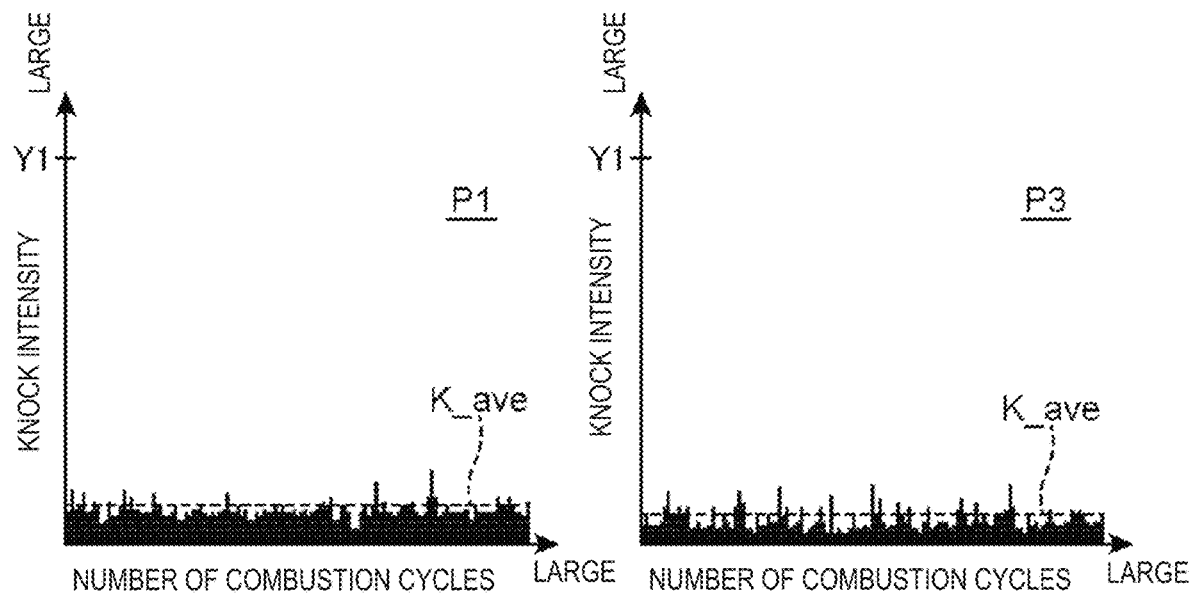
FIG. 5A
FIG. 5C
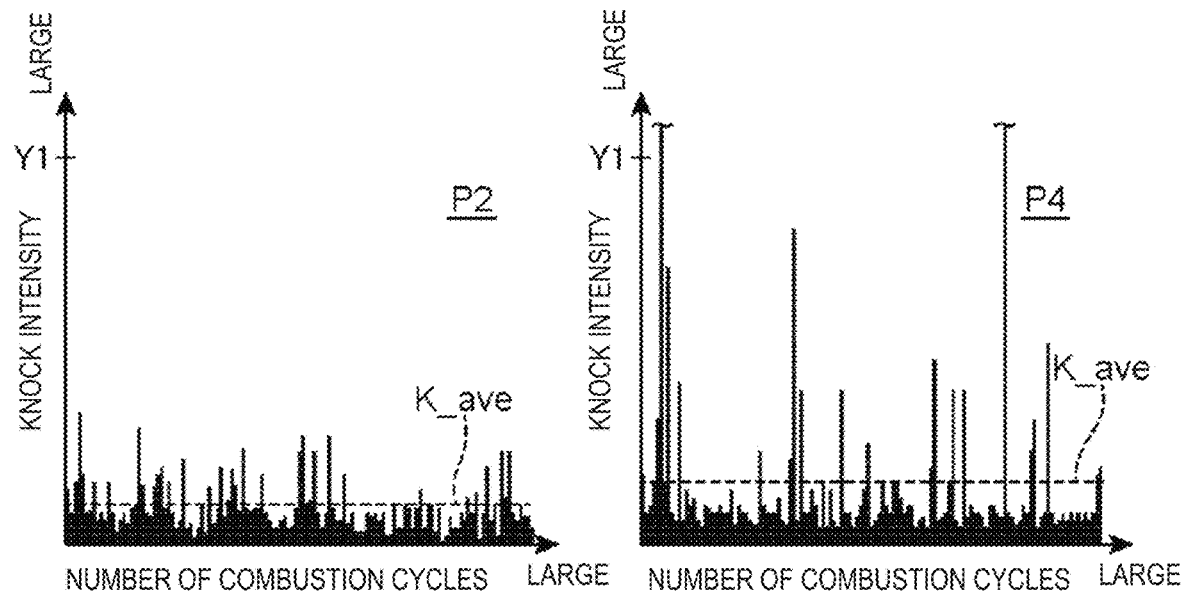
FIG. 5B
FIG. 5D

CONTROL DEVICE FOR ENGINE

TECHNICAL FIELD

The present disclosure relates to a method of controlling an engine provided with a cylinder where a mixture gas of air and fuel containing gasoline combusts, and also relates to a method of detecting a knock, and a control device for the engine.

BACKGROUND OF THE DISCLOSURE

Conventionally, in the field of engines, it is known that abnormal combustion, such as knocking, may occur locally when the engine load is high. As for the knocking, various measures are taken for preventing the knocking from occurring under high pressure inside a cylinder. In detail, under a condition in which the engine load is high and the temperature inside the cylinder is high, the mixture gas of fuel and air carries out self-ignition combustion, for example, in a perimeter part of the cylinder, in addition to a main combustion, thereby causing a high pressure wave, and causing vibration of the cylinder and the piston (i.e., a knock). Since noise increases when the knock occurs, it is demanded that the knock is prevented from occurring.

For example, JP2008-291758A discloses an engine in which a knock sensor that detects a knock is provided to an engine body, and when a knock is detected by the knock sensor, the ignition timing is retarded to avoid the occurrence of further knocking.

According to the configuration of JP2008-291758A, the retarding of the ignition timing can slow down the combustion inside the cylinder, and thereby, the pressure buildup inside the cylinder can be reduced. However, with the configuration in which the ignition timing is simply retarded to a timing at which knocking does not occur, the ignition timing is retarded excessively, and therefore, sufficient engine torque may not be secured. In detail, a significantly intensive knock may occur when the compression ratio of the cylinder is high, and depending on the combustion mode inside the cylinder. However, the frequency of occurrence of such a knock is very small. Therefore, if the ignition timing is simply retarded in order to avoid significantly intensive knocking, the retarding amount becomes excessive, and therefore, the engine torque decreases excessively during the normal operation in which intensive knocking does not occur. On the other hand, for example, it is considered to reduce the retarding amount of the ignition timing without taking intensive knocking into consideration. However, in this case, the engine body may be damaged by intensive knocking, thereby deteriorating the engine prematurely.

SUMMARY OF THE DISCLOSURE

The present disclosure is made in view of the above situations, and one purpose thereof is to provide a control device for an engine, capable of achieving both securing engine torque and degradation prevention of the engine.

According to one aspect of the present disclosure, a control device for an engine configured to control the engine where a cylinder is formed, is provided. The device includes a knock intensity sensor configured to detect a knock intensity that is an intensity of knock caused inside the cylinder, an output adjustment mechanism configured to adjust an output torque of the engine, and a controller configured to control the output adjustment mechanism based on the knock intensity detected by the knock intensity sensor. The controller executes a first control in which the output adjustment mechanism is controlled to reduce the knock intensity when the number of strong knocks that is the number of times the knock intensity becoming a second determination intensity or greater which is greater than a given first determination intensity is a given determination number or less and when the knock intensity is greater than the first determination intensity, and executes a second control in which the output adjustment mechanism is controlled to reduce the maximum torque of the engine more than when the number of strong knocks is the determination number or less, when the number of strong knocks is greater than the determination number.

According to this configuration, when the knock intensity is greater than the first determination intensity, the output adjustment mechanism is controlled to reduce the knock intensity. Thus, the opportunity for the knock intensity becoming greater than the first determination intensity can be kept low. Additionally, when the number of strong knocks, which is the number of times the knock intensity becoming greater than the second determination intensity which is greater than the first determination intensity, becomes greater than the determination number, the maximum torque of the engine is reduced more than when the number of strong knocks is the determination number or less. Thus, when the number of strong knocks is the determination number or less, and the number of times that the knock intensity becomes greater than the second determination intensity which is very high is comparatively small, and accordingly the damage to an engine body is still small, high engine torque can be secured. On the other hand, when the number of strong knocks becomes greater than the determination number and the damage of the engine body becomes comparatively large, by reducing the maximum torque of the engine, combustion energy generated in the cylinder is lowered, and as a result, further damage of the engine body can be prevented, thereby preventing further deterioration of the engine.

The controller may execute the second control only when the engine is operated in a high-speed high-load range in which an engine speed is a given reference speed or higher and the engine load is a given reference load or higher.

In the high-speed high-load range, the knock intensity tends to be high and the number of times that the knock intensity becomes greater than the second determination intensity is large. According to this configuration, by executing the second control in the high-speed high-load range, while the knock intensity is reliably prevented from becoming high, e.g., from becoming greater than the second determination intensity, and the damage of the engine body becomes great, the reduction of the engine torque in other range can be avoided.

The output adjustment mechanism may be an ignition plug configured to ignite a mixture gas inside the cylinder, provided to an engine body of the engine. The first control may be a control in which an ignition timing at which the mixture gas is ignited by the ignition plug is retarded when the knock intensity becomes greater than the first determination intensity, and the ignition timing is advanced when the knock intensity becomes less than the first determination intensity. The second control may be a control in which the ignition timing is retarded when the knock intensity becomes greater than a third determination intensity less than the first determination intensity, and the ignition timing is advanced when the knock intensity becomes less than the third determination intensity.

According to this configuration, with the simple configuration for retarding the ignition timing, the knock intensity can reliably be reduced when it is greater than the first determination intensity or the third determination intensity. On the other hand, when the knock intensity is less than the first determination intensity or less than the third determination intensity, by advancing the ignition timing, the engine torque can be secured. Moreover, when the number of strong knocks is greater than the determination number, the retarding amount of the ignition timing can be increased more than when the number of strong knocks is the determination number or less, and as a result, the maximum torque of the engine can reliably be reduced.

The controller may gradually decrease the third determination intensity as the number of strong knocks increases during the execution of the second control.

According to this configuration, the retarding amount of the ignition timing is increased as the number of strong knocks increases and the deterioration of the engine body progresses. Thus, while preventing rapid decrease of the engine torque, the maximum torque of the engine can be reduced appropriately according to the degraded condition of the engine body.

The determination number may be a first determination number. The controller may maintain the third determination intensity at the minimum value regardless of the number of strong knocks, when the number of strong knocks becomes greater than a second determination number greater than the first determination number, during the execution of the second control.

According to this configuration, the maximum torque of the engine excessively decreasing can be avoided.

Alternatively, the output adjustment mechanism may be an injector configured to inject fuel into the cylinder, provided to an engine body of the engine. The injector may be capable of carrying out an additional injection in which fuel is injected during a period from the second half of a compression stroke to the first half of an expansion stroke, and a main injection in which fuel is injected before the additional injection. The controller may control the injector so that the mixture gas combusts by self-ignition inside the cylinder. The first control may be a control in which both the main injection and the additional injection are carried out by the controller. The second control may be a control in which the total amount of fuel injected into the cylinder in one combustion cycle is reduced by the controller more than when the number of strong knocks is the number of determinations or less.

According to this configuration, by the first control including the main injection and the additional injection, the temperature of the mixture gas of air and the fuel of the main injection is effectively reduced with the latent heat of vaporization caused by the fuel of the additional injection and the increase of the knock intensity is prevented. Moreover, by the second control in which the total fuel amount is reduced, the maximum torque of the engine can be reduced securely when the number of strong knocks becomes greater than the determination number.

When the geometric compression ratio of the engine body is high, the knock intensity is large and the deterioration of the engine body tends to be prompted. Thus, if the configuration is applied to the engine in which the geometric compression ratio is set to 15:1 or higher and 25:1 or lower, the deterioration of the engine body is more effectively prevented.

BRIEF DESCRIPTION OF DRAWINGS

FIGS. 5A to 5D are graphs illustrating a knock intensity at operation points P1-P4, respectively.

FIG. 7B is a partially enlarged view of FIG. 7A.

DETAILED DESCRIPTION OF THE DISCLOSURE (1) Overall Configuration of Engine

Figure 1:
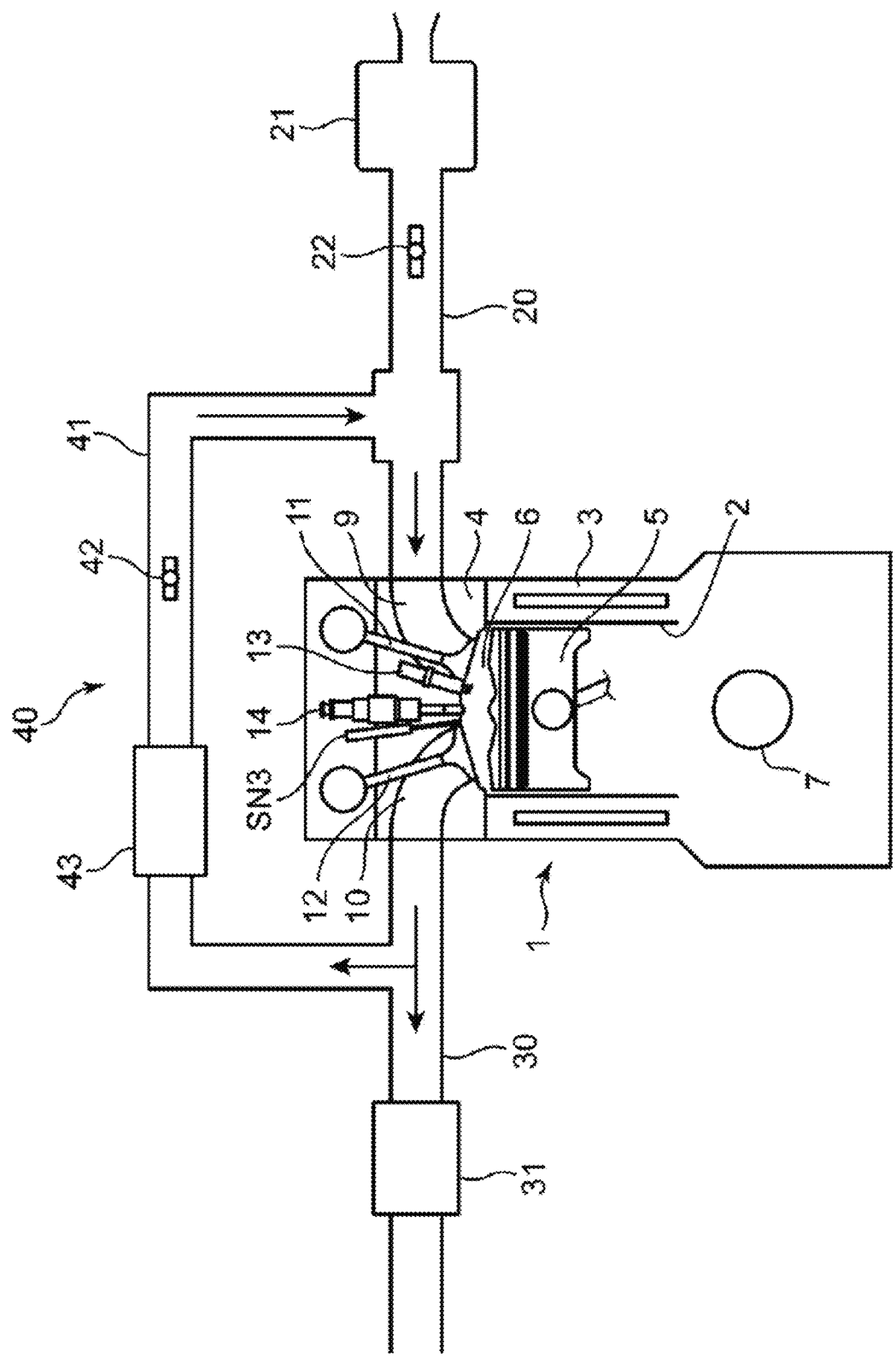
FIG. 1 is a view illustrating a configuration of an engine system according to one embodiment of the present disclosure.

FIG. 1 is a view illustrating a configuration of an engine system to which a control device for an engine of the present disclosure is applied. The engine system of this embodiment includes an engine body 1 of four strokes, an intake passage 20 for introducing air for combustion into the engine body 1, and an exhaust passage 30 for discharging exhaust gas generated inside the engine body 1.

The engine body 1 is, for example, an inline 4-cylinder engine in which four cylinders 2 are lined up in a direction perpendicular to the drawing surface of FIG. 1. This engine system is mounted on a vehicle, and the engine body 1 is used as a drive source of the vehicle. In this embodiment, engine body 1 is driven by being supplied fuel containing gasoline. Note that the fuel may be gasoline containing bioethanol, etc.

The engine body 1 includes a cylinder block 3 where the cylinders 2 are formed therein, a cylinder head 4 provided on an upper surface of the cylinder block 3, and pistons 5 fitted in the respective cylinders 2 so as to be reciprocatable (up-and-down motion).

A combustion chamber 6 is formed above each piston 5. The combustion chamber 6 is a so-called pentroof type in which a ceiling surface of the combustion chamber 6, which is comprised of a lower surface of the cylinder head 4, is a triangular roof comprised of two slopes on the intake side and the exhaust side. Note that here, a part of the internal space of the cylinder 2 between a crown surface of the piston 5 and the ceiling surface of the combustion chamber 6 is referred to as the "combustion chamber" 6, regardless of the position of the piston 5 and the combustion state of mixture gas.

The geometric compression ratio of the engine body 1 (i.e., a ratio of a volume of the combustion chamber 6 when the piston 5 is located at a bottom dead center to a volume of the combustion chamber 6 when the piston 5 is located at a top dead center) is set 15:1 or higher and 25:1 or lower (e.g., about 17:1).

In the cylinder head 4, intake ports 9 for introducing air supplied from the intake passage 20 into the cylinders 2 (combustion chambers 6) and exhaust ports 10 for discharging exhaust gas generated inside the cylinders 2 to the exhaust passage 30 are formed. Two intake ports 9 and two exhaust ports 10 are provided to each cylinder 2.

The cylinder head 4 is provided with the intake ports 9 and the exhaust ports 10 which open to the combustion chamber 6, intake valves 11 which open and close the intake ports 9, and exhaust valves 12 which open and close the exhaust ports 10. The valve type of the engine of this embodiment is a four-valve type comprised of two intake valves and two exhaust valves, and therefore, two intake ports 9, two exhaust ports 10, two intake valves 11, and two exhaust valves 12 are provided to each cylinder 2. Although illustration is omitted, in this embodiment, a swirl valve (not illustrated) which can be opened and closed is provided to one of the two intake ports 9 connected to one cylinder 2 to change the strength of a swirl flow inside the cylinder 2 (a rotational flow which circles about the cylinder axis).

The cylinder head 4 is provided to injectors 14 which inject fuel. Each injector 14 is attached so that a tip-end part thereof where nozzle holes are formed is located near the center of the ceiling surface of the combustion chamber 6 and faces the center of the combustion chamber 6. The injector 14 has a plurality of nozzle holes at the tip end, and is configured to inject fuel, in a cone shape centering on the center axis of the cylinder 2 (in detail, a hollow cone shape), from near the center of the ceiling surface of the combustion chamber toward the crown surface of the piston 5. Note that the specific configuration of the injector 14 is not limited to the above and may have a single nozzle hole.

The cylinder head 4 is provided with an ignition plug 13 which ignites a mixture gas inside the combustion chamber 6. The ignition plug 13 is disposed so that a tip end thereof is located near the center of the ceiling surface of the combustion chamber 6 and faces the center of the combustion chamber 6.

The cylinder head 4 is further provided with an in-cylinder pressure sensor SN3 which detects an in-cylinder pressure which is a pressure inside the combustion chamber 6. One in-cylinder pressure sensor SN3 is provided to each cylinder 2. In this embodiment, this in-cylinder pressure sensor SN3 is an example of a "knock intensity sensor" in the present disclosure.

The intake passage 20 is provided with an air cleaner 21 and a throttle valve 22 which opens and closes the intake passage 20, in this order from the upstream side. In this embodiment, while the engine is operated, the throttle valve 22 is fundamentally maintained at fully opened or an opening near fully opened, and it is closed only under a limited operating condition, such as when the engine is stopped, to intercept the intake passage 20.

The exhaust passage 30 is provided with an emission control device 31 which purifies exhaust gas. For example, the emission control device 31 includes a three-way catalyst therein.

The exhaust passage 30 is provided with an exhaust gas recirculation (EGR) device 40 which recirculates a portion of exhaust gas which passes through the exhaust passage 30 (i.e., burnt gas) to the intake passage 20, as EGR gas. The EGR device 40 has an EGR passage 41 which communicates a part of the intake passages 20 downstream of the throttle valve 22 with a part of the exhaust passage 30 upstream of the emission control device 31, and an EGR valve 42 which opens and closes the EGR passage 41. Moreover, in this embodiment, an EGR cooler 43 which cools EGR gas which passes therethrough is provided to the EGR passage 41, and the EGR gas is recirculated to the intake passage 20 after being cooled by the EGR cooler 43.

(2) Control System

Figure 2:
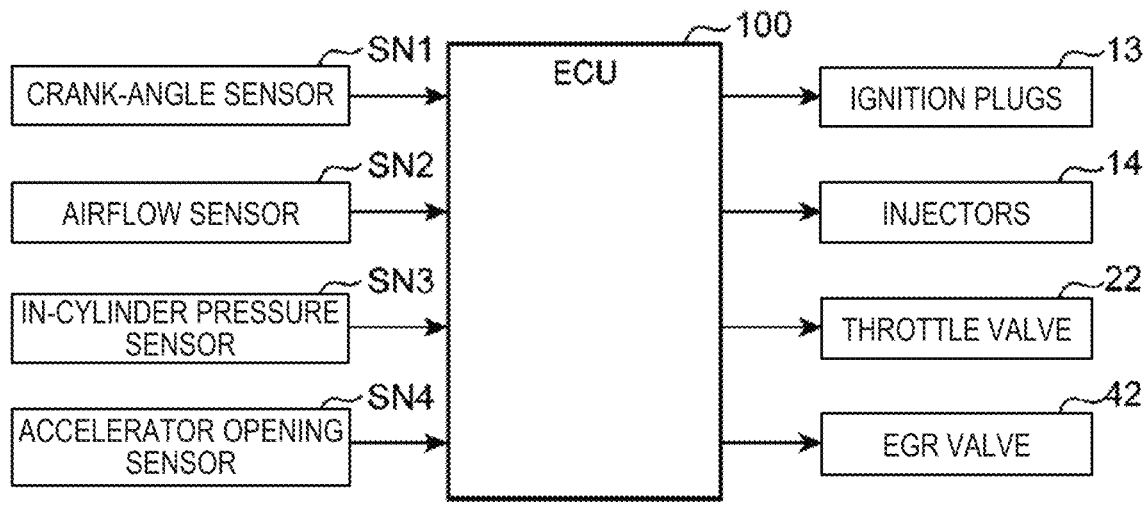
FIG. 2 is a block diagram illustrating an engine control system.

FIG. 2 is a block diagram illustrating a control system of the engine. The engine system of this embodiment is comprehensively controlled by an ECU (electronic control unit) 100. The ECU 100 is a microcomputer comprised of a processor (e.g., a central processing unit (CPU)) having associated memory such as ROM and RAM, etc. which are well-known.

Various sensors are provided to the vehicle, and the ECU 100 is electrically connected with these sensors. For example, a crank-angle sensor SN1 which detects an engine speed is provided to the cylinder block 3. Moreover, an airflow sensor SN2 which detects an amount of air taken into each cylinder 2 therethrough is provided to the intake passage 20. Moreover, an in-cylinder pressure sensor SN3 which detects a pressure inside the combustion chamber 6 is provided to the cylinder head 4. One in-cylinder pressure sensor SN3 is provided to each cylinder 2, as described above. Moreover, an accelerator opening sensor SN4 which detects an opening of an accelerator pedal (accelerator opening), which is not illustrated, operated by an operator is provided to the vehicle.

The ECU 100 performs various calculations based on input signals from these sensors SN1-SN4, etc., and controls each part of the engine, such as the ignition plug 13, the injector 14, the throttle valve 22, and the EGR valve 42.

(3) Combustion Mode

Figure 3:
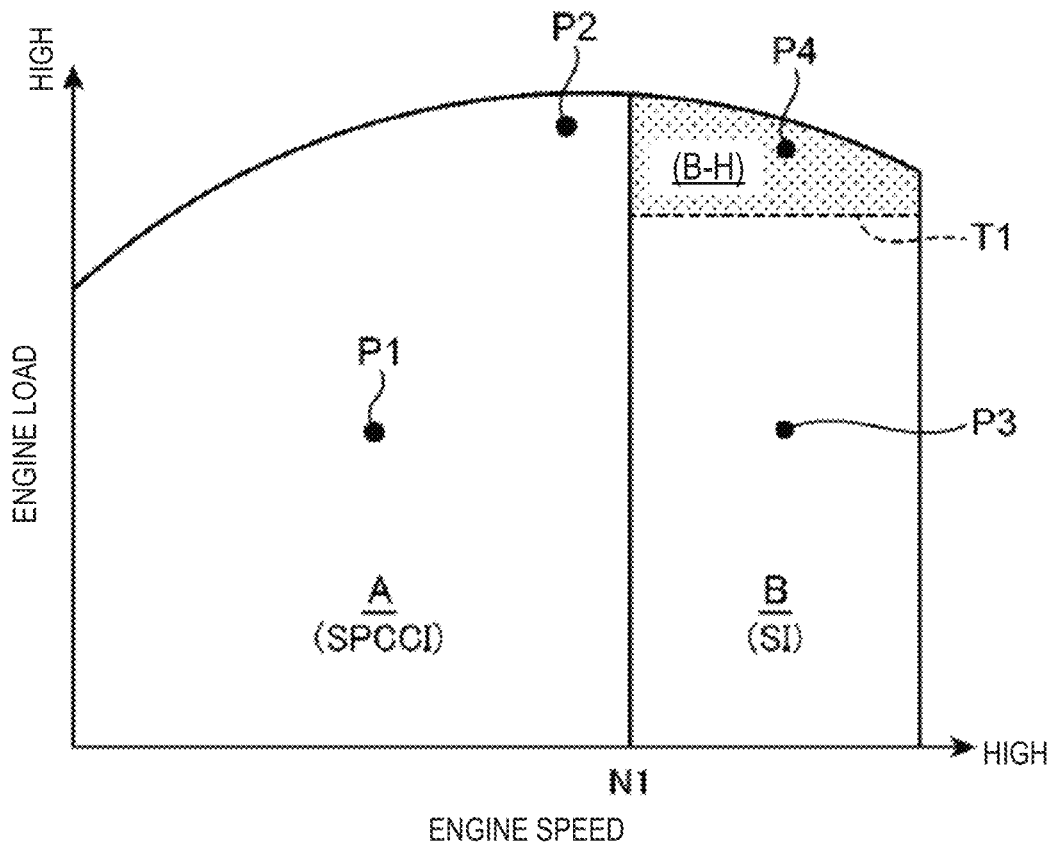
FIG. 3 is a view illustrating a control map.

FIG. 3 illustrates a control map in which the horizontal axis is the engine speed and the vertical axis is the engine load. In this embodiment, the operating range of the engine is divided into a low-speed range A where the engine speed is below a reference speed N1 set beforehand and a high-speed range B where the engine speed is the reference speed N1 or above.

In the low-speed range A, partial compression ignition combustion (hereinafter, referred to as "SPCCI combustion") in which SI (spark ignition) combustion and CI (compression ignition) combustion are mixed is performed. Note that "SPCCI" in SPCCI combustion is an abbreviation for "SPark Controlled Compression Ignition."

SI combustion is a mode in which the mixture gas is ignited by the ignition plug 13, and the mixture gas is forcibly combusted by flame propagation which expands its combustion area from the igniting point to the perimeter. CI combustion is a mode in which the mixture gas is combusted by self-ignition under an environment where the mixture gas is made high in temperature and pressure by the compression of the piston 5. Moreover, SPCCI combustion which is a combination of SI combustion and CI combustion is a combustion mode in which SI combustion of a portion of the mixture gas inside the combustion chamber 6 is carried out by jump-spark ignition performed under an environment just before the mixture gas self-ignites, and CI combustion of the remaining mixture gas inside the combustion chamber 6 is carried out by self-ignition after the SI combustion (by a further increase in the temperature and the pressure accompanying the SI combustion).

As the temperature and the pressure inside the combustion chamber 6 increase by SI combustion, this causes unburnt mixture gas to self-ignite, thereby starting CI combustion. After the start of CI combustion, SI combustion and CI combustion are performed in parallel. SI combustion is slower in the combustion rate than CI combustion. Thus, the heat release during SI combustion is lower than the heat release during CI combustion, and in SPCCI combustion, a rising slope of a rate of heat release becomes relatively shallower than CI combustion. In CI combustion, the rate of heat release becomes relatively steep because CI combustion is higher in heat release than SI combustion. However, since CI combustion is performed after a compression top dead center, a slope of a waveform of the rate of heat release will not become excessive. That is, since a motoring pressure falls according to a descent of the piston 5 after the compression top dead center, this reduces the increase in the rate of heat release. Thus, because of the nature of SPCCI combustion in which CI combustion is performed after SI combustion, it is difficult for dP/dθ (a rate of climb of the in-cylinder pressure with respect to the crank angle) used as an index of combustion noise to become excessive, and therefore, combustion noise can be reduced compared with simple CI combustion (when carrying out CI combustion of all the fuel). Moreover, since CI combustion is faster in the combustion rate than SI combustion, SPCCI combustion can bring a combustion end timing earlier than the simple SI combustion (when carrying out SI combustion of all the fuel). In other words, SPCCI combustion can bring the combustion end timing close to the compression top dead center during an expansion stroke. Therefore, SPCCI combustion can improve fuel efficiency compared with the simple SI combustion.

On the other hand, in the high-speed range B, since it becomes difficult to self-ignite the mixture gas at a desired timing because of the fast moving speed of the piston 5, SI combustion adopted for a conventional gasoline engine is carried out. SI combustion is a combustion mode in which almost all the mixture gas combusts by flame propagation, and electric discharge is performed from the ignition plug 13 near a compression top dead center, and the mixture gas around the ignition plug 13 is forcibly ignited. Then, flame propagates around from the circumference of the ignition plug 13, and the remaining mixture gas is combusted forcibly by flame propagation.

The ECU 100 determines whether the current operating range is either the low-speed range A or the high-speed range B based on the engine speed and the engine load, and based on the determination result and the current operating condition of the engine body 1 (engine speed, the engine load, etc.), controls the injector 14, the ignition plug 13, etc. so that suitable SPCCI combustion or SI combustion is achieved. Note that the engine load is calculated from the engine speed, the accelerator opening, etc. The ECU 100 is an example of a "controller" of the present disclosure.

(4) Mechanism of Engine Damage

As described above, fundamentally in SI combustion, the heat release is low and the increase in the in-cylinder pressure is slow. However, when the engine is operated in a high-speed high-load range B-H of the high-speed range B where the engine load is above a reference load Ti, and the engine load and the engine speed are high, the temperature and the pressure of a portion of the mixture gas may increase rapidly inside the combustion chamber 6, this mixture gas may carry out self-ignition combustion, and therefore, the in-cylinder pressure may increase rapidly and a so-called knock may occur. Particularly, in this embodiment, as described above, since the geometric compression ratio of the cylinder 2 is set high, the temperature and the pressure inside the combustion chamber 6 tend to become high, and therefore, the in-cylinder pressure tends to rapidly increase locally. When the in-cylinder pressure increases rapidly, noise emitted from the engine body increases. Moreover, when the in-cylinder pressure becomes excessively high and the amount of rapid increase becomes very large, it is said that the engine body is damaged.

However, the present inventors discovered that, even if the in-cylinder pressure is simply increased rapidly, the engine body is hardly damaged depending on the increased amount, i.e., the engine body is damaged only when the in-cylinder pressure increases exceeding a certain level. This will be described next.

First, the present inventors researched in detail on a state where the engine body 1 cannot operate appropriately. As a result, they discovered that the upper surface of the cylinder block 3 may be corroded after the engine body 1 is operated over a long period of time.

Figure 4:
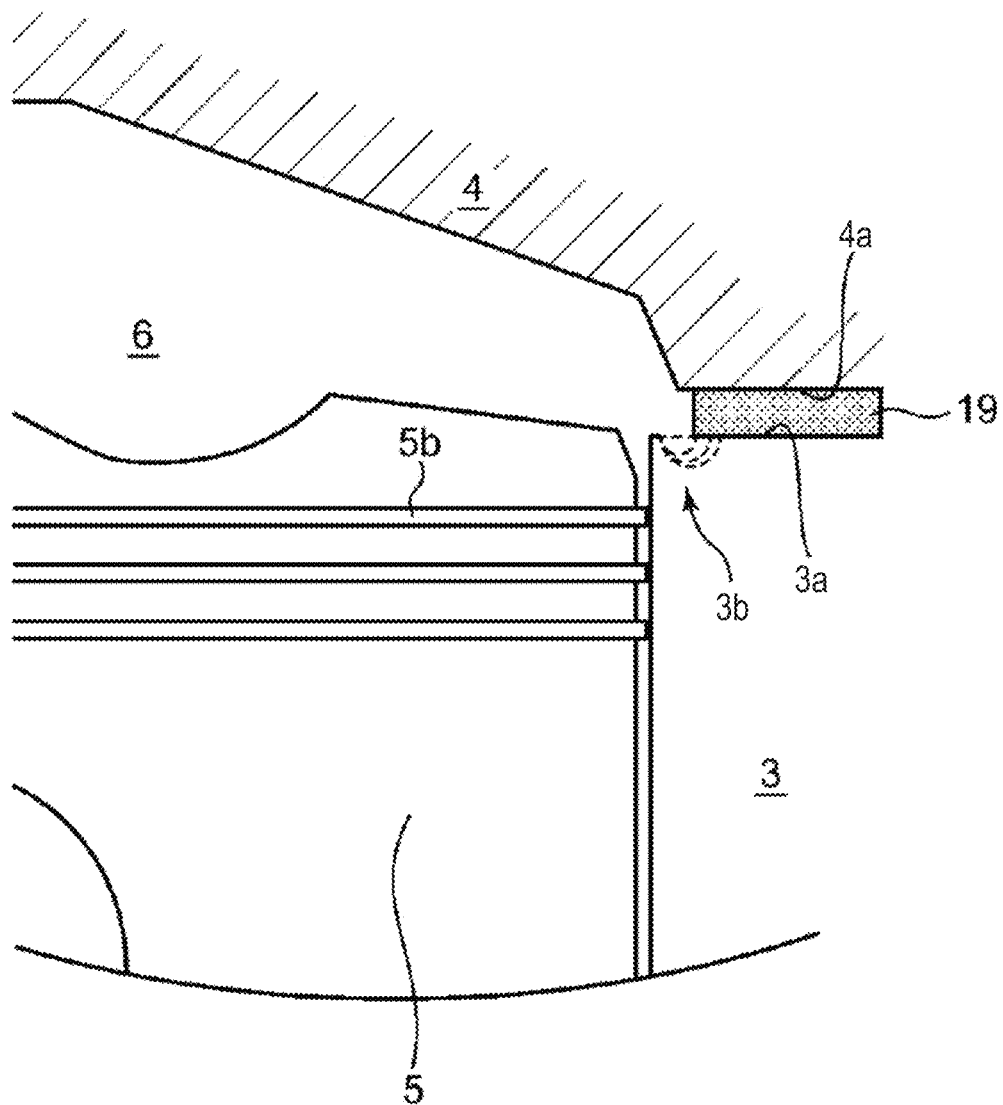
FIG. 4 is a cross-sectional view schematically illustrating a part of an engine body.

In detail, as illustrated in FIG. 4 which is a partial schematic cross-sectional view of the engine body 1, a gasket 19 is inserted between an upper surface 3a of the cylinder block 3 and a lower surface 4a of the cylinder head 4. However, the cylinder block 3 projects radially inward from the radially inward end of the cylinder head 4, and the gasket 19 extends radially outward from the radially inward end of the cylinder head 4. In connection with this, a part 3b radially inward of the upper surface 3a of the cylinder block 3 is exposed to the combustion chamber 6, and therefore, this exposed part corrodes. For example, if the cylinder block 3 is made of aluminum, the surface of aluminum is exposed to the combustion chamber 6, and therefore, aluminum corrodes. Thus, when the upper surface 3a of the cylinder block 3 is corroded, and the amount of corrosion (it is a corrosion depth and is a distance from the upper surface 3a of the cylinder block 3 to a lower end of the corroded part) becomes more than a given amount, a gap between the cylinder block 3 and the cylinder head 4 increases. As a result, the gasket 19 is no longer appropriately pressure-bonded to the cylinder block 3 and the cylinder head 4, and the gap is increased. When the gap is increased between the cylinder block 3 and the cylinder head 4, a portion of gas inside the combustion chamber 6 leaks to the exterior through this gap, and it becomes impossible for the engine body 1 to operate suitably. Thus, the present inventors discovered that the suitable operation of the engine body 1 became impossible by the upper surface 3a of the cylinder block 3 being corroded. That is, they discovered that the damaged condition of the engine body 1 (i.e., a degree of degradation) can be determined by the amount of corrosion of the cylinder block 3.

Next, the present inventors researched on a state of the combustion chamber 6 when the cylinder block 3 is corroded. As a result, they discovered that the corrosion of the cylinder block 3 occurs when the mixture gas unsuitably carries out self-ignition combustion inside the combustion chamber 6 and the in-cylinder pressure increases as described above, but, unless the amount of increase in the in-cylinder pressure exceeds a certain level, the corrosion hardly occurs.

Figure 6:
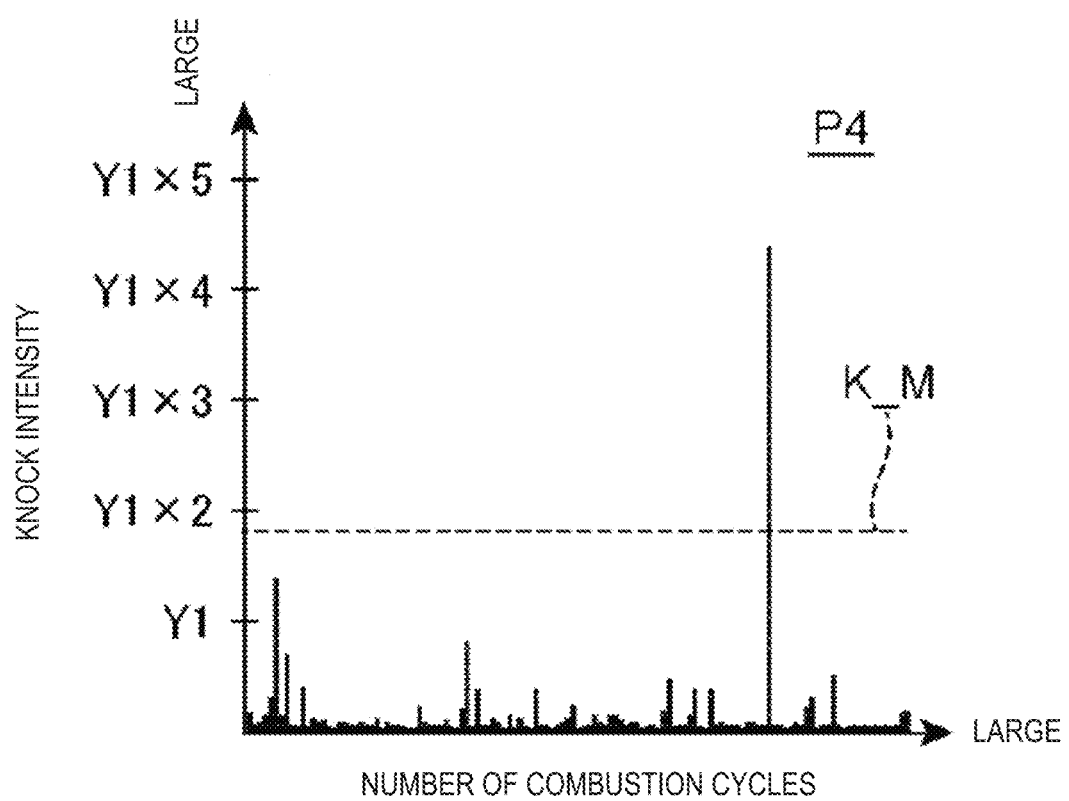
FIG. 6 is a graph illustrating the knock intensity at the operation point P4.
Figure 7A:
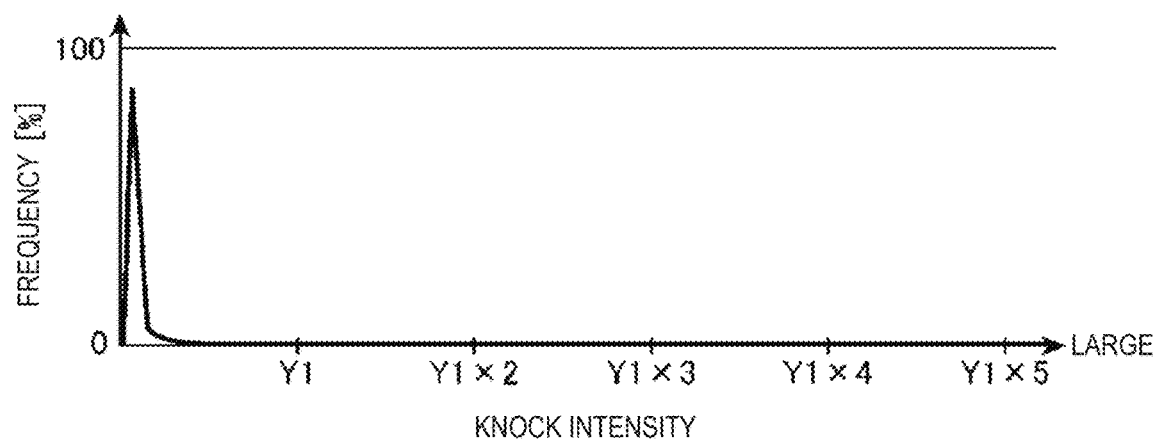
FIGS. 7A and 7B are graphs illustrating a relationship between the knock intensity and a frequency of occurrence at the operation point P4, where
Figure 7B:
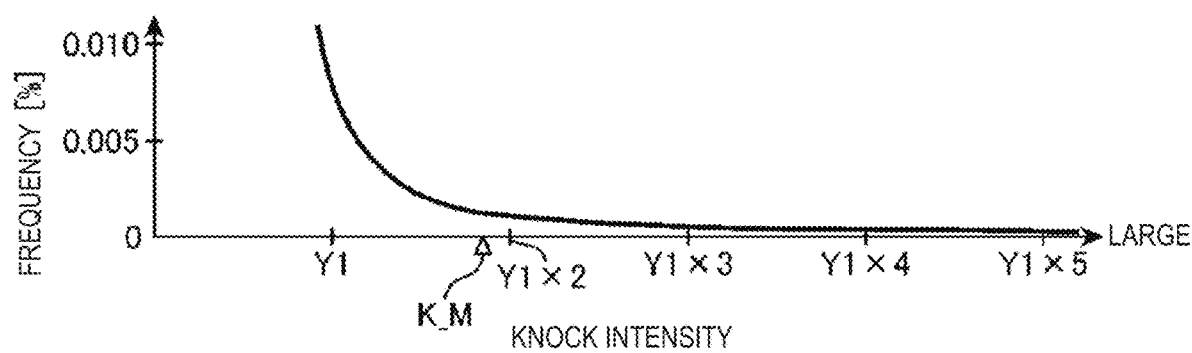

FIGS. 5A to 5D illustrate graphs where the horizontal axis is the number of combustion cycles and the vertical axis is the maximum amount of increase in the in-cylinder pressure caused by combustion. In detail, the value of the vertical axis is the maximum value of values which are obtained by subtracting the in-cylinder pressure during motoring (i.e., a pressure inside the combustion chamber 6 when combustion does not take place inside the combustion chamber 6) from an actual in-cylinder pressure (detected by the in-cylinder pressure sensor SN3) in respective combustion cycles, and is the amount of increase in the in-cylinder pressure. Below, the amount of increase in the in-cylinder pressure caused by combustion is suitably referred to as the "in-cylinder pressure increased amount," and the maximum value of the amount of increase in the in-cylinder pressure is referred to as the "knock intensity." FIGS. 5A to 5D are results obtained at the respective operation points P1-P4 of FIG. 3. Although FIG. 6 illustrates the graph at the operation point P4 included in the high-speed high-load range B-H and is the same graph as FIG. 5D, the maximum value of the vertical axis of FIG. 6 is greater than the maximum value of the vertical axis of FIG. 5D. Y1 of each graph of FIGS. 5A to 5D and FIG. 6 is the same value. FIG. 7A is a graph where the horizontal axis is the knock intensity and the vertical axis is a frequency of occurrence of the knock intensity, and illustrates the result at the operation point P4. FIG. 7B is an enlarged view of a part of FIG. 7A. Note that these graphs are results when an ignition is carried out at a basic ignition timing set beforehand without retarding the ignition timing described later.

In FIGS. 5A to 5D, K_ave indicates an average value of the knock intensity at each operation point. As illustrated in these figures, the knock intensity varies according to the combustion cycle, but the knock intensity is fundamentally kept less than about 2 to 3 times of the average value K_ave at the operation point. However, as illustrated in FIG. 5D and FIG. 6, when the operation point is the operation point P4 where the engine speed and the engine load are high, and when the engine is operated at the operation point included in the high-speed high-load range B-H (FIG. 3), the knock intensity may very rarely exceed a value K_M which is about 10 times of the average value K_ave. This is also illustrated in FIGS. 7A and 7B. That is, as illustrated in FIG. 7A, also at the operation point P4, the knock intensity is kept at a comparatively small value in most of the combustion cycles. However, although it is a very small frequency of 0.0001% (it is one time in 1 million cycles), the knock intensity may become very large and may exceed the value K_M which is about 10 times of the average value K_ave. Note that for example, the average value K_ave of the knock intensity is about 5 bar at the operation points P1-P3, the average value K_ave of the knock intensity is about 8 bar at the operation point P4, and the value K_M is about 80 bar.

Figure 8:
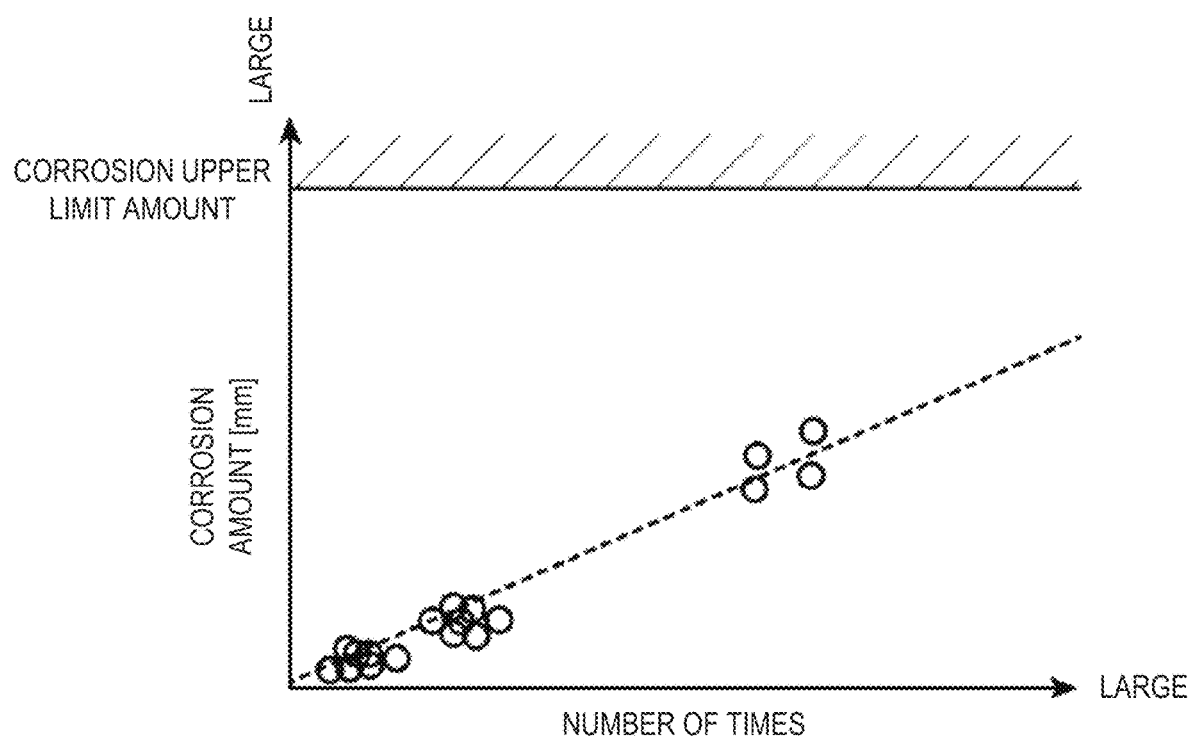
FIG. 8 is a graph illustrating a relationship between the number of strong knocks and an amount of corrosion.

FIG. 8 is a graph illustrating a relationship between the number of times the knock intensity exceeded 80 bar (the number of combustion cycles), and the amount of corrosion of the cylinder block 3 (the corrosion depth). Note that circles in FIG. 8 are experimental results, and a broken line indicates a relationship between the number of times the knock intensity exceeded 80 bar and the amount of corrosion which are estimated from the experimental results. As illustrated in FIG. 8, the number of times the knock intensity exceeded 80 bar is proportional to the amount of corrosion of the cylinder block 3, and the amount of corrosion increases as the number of times the knock intensity exceeded 80 bar increases. As is clear from this result, mainly, when the knock intensity is about 80 bar and well exceeds the average value of the knock intensity, the cylinder block 3 is corroded. The upper limit of the corrosion in FIG. 8 is the minimum value of the amount of corrosion at which the leak of the combustion gas from the combustion chamber 6 occurs, and, for example, is about 450 micrometers.

Note that the reason why the knock intensity increases to about 80 bar at which it corrodes the cylinder block 3 is as follows.

Figure 9A:
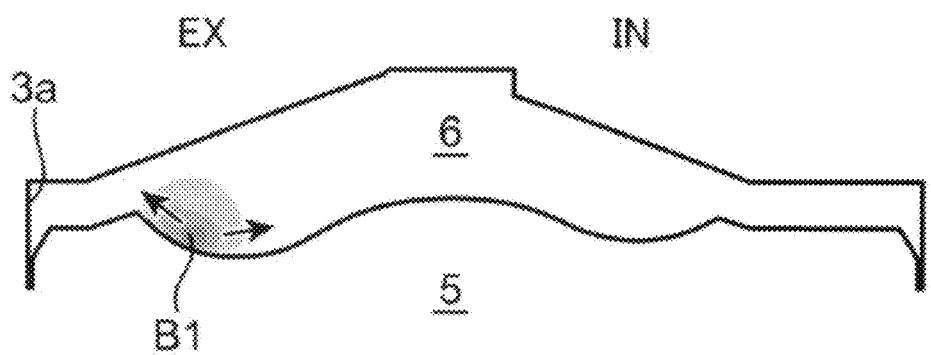
FIGS. 9A to 9C are views illustrating a pressure distribution of a combustion chamber at different time points.
Figure 9B:
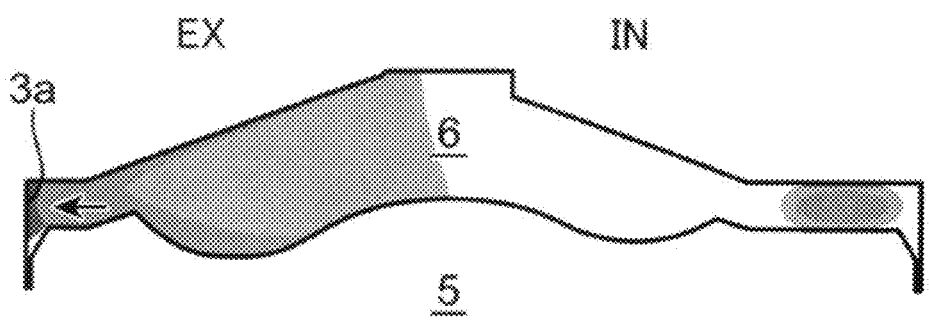
Figure 9C:
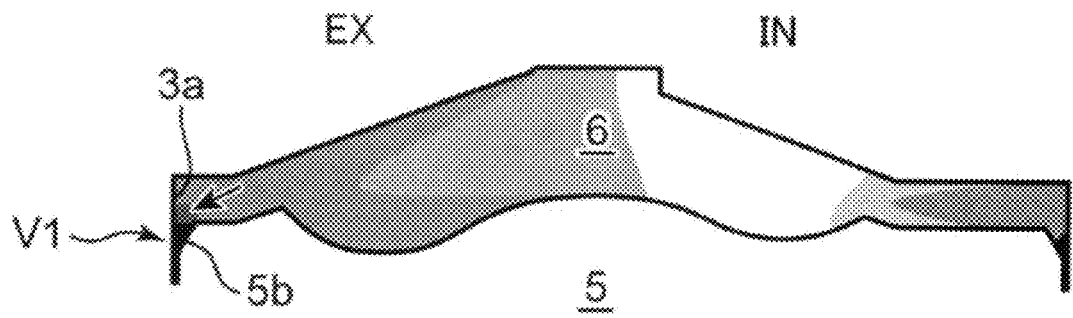

FIGS. 9A to 9C are results of calculating a pressure distribution inside the combustion chamber 6 when the knock intensity reaches the level at which it corrodes the cylinder block 3. In FIGS. 9A to 9C, a darker color indicates a higher pressure. In FIG. 9, "EX" indicates the exhaust side (the side where the exhaust valve 12 is disposed), and "IN" indicates the intake side (the side where the intake valve 11 is disposed). FIGS. 9A to 9C illustrate the pressure distribution at each timing, and the time progresses in this order.

A point B1 illustrated in FIG. 9A is a point at which self-ignition of the mixture gas is started. As illustrated in FIG. 9A, since the circumference of the exhaust valve 12 through which hot exhaust gas circulates is higher in temperature than the circumference of the intake valve 11 through which cold intake air circulates, the pressure in an area on the exhaust valve 12 side becomes higher than the pressure in an area on the intake valve 11 side near a compression top dead center. Thus, point B1 at which the temperature and the pressure become locally high and the self-ignition starts is also included in the area on the exhaust side. As illustrated in FIGS. 9A and 9B, when the mixture gas self-ignites at point B1, the pressure wave propagates around, and the pressure around point B1 increases. At this time, fundamentally, the pressure wave reflects on an inner circumferential surface 3a of the cylinder block 3 and spreads entirely inside the combustion chamber 6. However, as illustrated in FIG. 9C, a part of the pressure wave may enter into a gap V1 between the inner circumferential surface 3a of the cylinder block 3 and an outer circumferential surface of the piston 5. Therefore, if the pressure wave enters into the gap V1, the pressure wave toward the gap V1 overlaps with the pressure wave reflected on a piston ring 5b (see FIG. 4) after entered into the gap V1 to amplify the pressure waves, and therefore, the pressure inside the gap V1 becomes very high. Thus, the reason why the knock intensity increases to the level at which it corrodes the cylinder block 3 is thought because the pressure wave caused by the self-ignition of the mixture gas enters into the gap V1 and is amplified.

Here, when the engine load is high, since the combustion energy generated in the combustion chamber 6 is large, the temperature inside the combustion chamber 6 becomes high. Moreover, when the engine load is high, since the amount of fuel supplied to the combustion chamber 6 is large, the mixture gas tends to become locally rich (the fuel concentration becomes high), and the mixture gas tends to self-ignite. Moreover, when the engine speed is high, since the period of time per one crank becomes shorter, the heat energy which escapes from the wall surface of the combustion chamber 6 outside decreases, and therefore, the temperature inside the combustion chamber 6 tends to become high. Therefore, as described above, when the engine speed and the engine load are high (i.e., when the engine is operated in the high-speed high-load range B-H), the in-cylinder pressure tends to become high, and thereby, the knock intensity may exceed the value K_M.

(5) Ignition Timing Control

When the in-cylinder pressure increases rapidly as described above, noise emitted from the engine body increases. Moreover, when the amount of increase in the in-cylinder pressure becomes very large, the degradation of the engine body 1 is stimulated. Thus, in this embodiment, the ignition timing is controlled in order to prevent the rapid increase in the in-cylinder pressure. A control of the ignition timing according to this embodiment which is executed by the ECU 100 is described with reference to flowcharts of FIGS. 10 and 11.

First, at Step S1, the ECU 100 reads varieties of information, such as a detection value of the in-cylinder pressure sensor SN3, and the engine speed.

Next, at Step S2, the ECU 100 calculates the knock intensity. In this embodiment, the ECU 100 calculates the in-cylinder pressure increased amount by applying a high pass filter to the in-cylinder pressure detected by the in-cylinder pressure sensor SN3, and then calculates the maximum value of the in-cylinder pressure increased amounts obtained in one combustion cycle, as the knock intensity.

Next, at Step S3, the ECU 100 determines whether the knock intensity calculated at Step S2 is equal to or above a strong knock determining value which is set beforehand. The strong knock determining value is the minimum value of the knock intensity at which it corrodes the cylinder block 3, is determined beforehand by an experiment, etc., and is stored in the ECU 100. For example, the strong knock determining value is set to about 80 bar. In this embodiment, the strong knock determining value is an example of a "second determination intensity" of the present disclosure.

If the determination at Step S3 is YES and the knock intensity is the strong knock determining value or above, the ECU 100 shifts to Step S4. At Step S4, the ECU 100 increments the number of strong knocks which is the number of times the knock intensity becomes the strong knock determining value or above. In detail, the ECU 100 adds 1 to the stored number of strong knocks, and then stores this acquired value as the new number of strong knocks. Note that the initial value of the number of strong knocks (a value at the factory shipment, etc. of the engine body 1 which has never been operated) is 0, and the ECU 100 continues storing the number of strong knocks before the operation of the engine body 1 is stopped, even after the operation of the engine body 1 is stopped. After Step S4, the ECU 100 shifts to Step S5.

On the other hand, if the determination at Step S4 is NO, the ECU 100 shifts to Step S5, without updating the number of strong knocks.

At Step S5, the ECU 100 sets the basic ignition timing which is the basic value of the ignition timing. The basic ignition timing is set and stored beforehand in the ECU 100. For example, the basic ignition timing is set corresponding to the engine speed and the engine load and is stored in the form of a map, and the ECU 100 extracts a value corresponding to the current engine speed and engine load from this map. Note that the basic ignition timing is set near a compression top dead center in all the operating ranges of the engine body 1.

Next, at Step S6, the ECU 100 sets a first reference intensity which is a threshold of the knock intensity used for a determination of whether to carry out a retardation of the ignition timing, as will be described later. The first reference intensity is set and stored beforehand in the ECU 100. The first reference intensity is the maximum value of the knock intensity at which noise emitted from the engine body 1 can be kept below the given level, and is set to a value sufficiently less than the knock intensity at which the cylinder block 4 is corroded. In this embodiment, the different first reference intensities are set corresponding to the engine speed and the engine load, and stored in the ECU 100. At Step S6, the first reference intensity corresponding to the current engine speed and engine load is extracted. For example, each first reference intensity is set to a value of 10 bar or greater and 30 bar or lower.

Next, at Step S7, the ECU 100 determines whether a condition in which the number of strong knocks is greater than a first determination number C1, and the engine is operated in the high-speed high-load range B-H is satisfied. The first determination number C1 is set beforehand and is stored in the ECU 100. This first determination number C1 is set, for example, to about 800 or greater and about 1200 or less. This first determination number C1 is an example of the "determination number" and the "first determination number" of the present disclosure.

If the determination at Step S7 is NO, and the engine is operated in a range other than the high-speed high-load range B-H or the number of strong knocks is the first determination number C1 or less, the ECU 100 shifts to Step S8. At Step S8, the ECU 100 sets a retard conducting knock intensity to the first reference intensity, and then shifts to Step S12. The retard conducting knock intensity is a threshold used for the determination of whether to carry out a retardation of the ignition timing as described later, and when the knock intensity is greater than this retard conducting knock intensity, the ignition timing is retarded.

On the other hand, if the determination at Step S7 is YES, the number of strong knocks is greater than the first determination number C1, and the engine is operated in the high-speed high-load range B-H, the ECU 100 shifts to Step S9. At Step S9, the ECU 100 further determines whether the number of strong knocks is a second determination number C2 or less. The second determination number C2 is set greater than the first determination number C1. The second determination number C2 is set, for example, to a value about 300 greater than the first determination number C1.

If the determination at Step S9 is NO and the number of strong knocks is greater than the second determination number C2, the ECU 100 shifts to Step S10. At Step S10, the ECU 100 sets the retard conducting knock intensity to a second reference intensity set beforehand, and then shifts to Step S12. The second reference intensity is set less than the first reference intensity. For example, the second reference intensity is set to a value about 5 to 10 bar less than the first reference intensity, and is stored in the ECU 100.

Figure 12:
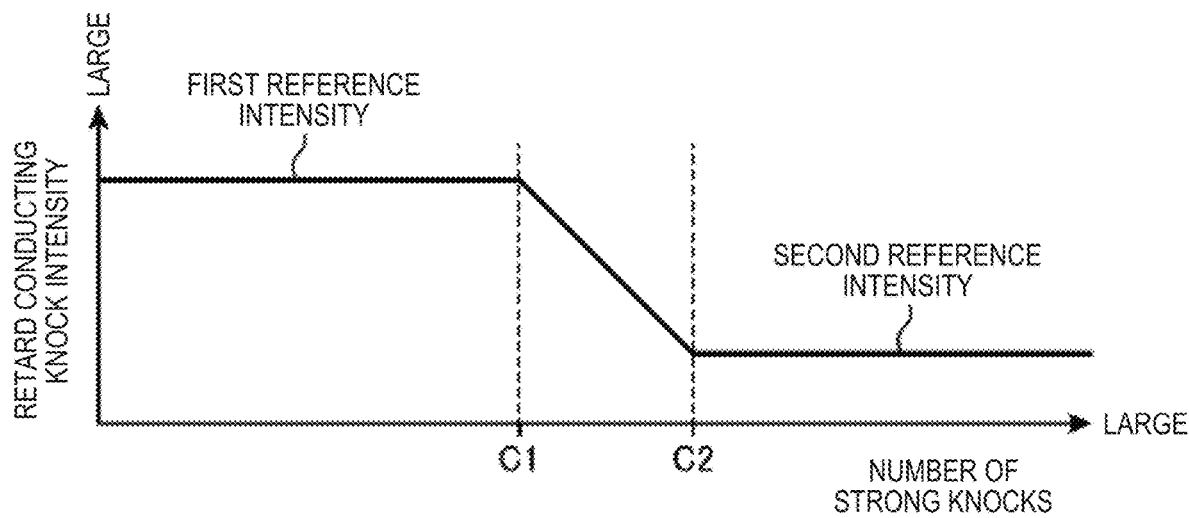
FIG. 12 is a view illustrating a relationship between the number of strong knocks, and a retard conducting knock intensity.

On the other hand, if the determination at Step S9 is YES, and the number of strong knocks is the second determination number C2 or less (and greater than the first determination number C1), the ECU 100 shifts to Step S11. At Step S11, the ECU 100 sets the retard conducting knock intensity to a value between the first reference intensity and the second reference intensity. In detail, as illustrated in FIG. 12, the retard conducting knock intensity is set to a value between the first reference intensity and the second reference intensity so that the retard conducting knock intensity decreases proportional to the number of strong knocks as the number of strong knocks becomes greater. After Step S11, the ECU 100 shifts to Step S12.

At Step S12, the ECU 100 determines whether the knock intensity calculated at Step S3 is greater than the retard conducting knock intensity set at Step S8, S10, or S11.

If the determination at Step S12 is NO and the knock intensity is the retard conducting knock intensity or less, the ECU 100 shifts to Step S13. At Step S13, the ECU 100 updates an ignition retarding amount (i) to a value obtained by subtracting a unit advancing amount from an ignition retarding amount (i−1) calculated previously at the same operation point. In detail, in this embodiment, Steps S1-S15 are carried out for every combustion cycle. Then, the ECU 100 stores the ignition retarding amount for each operation point (corresponding to the engine speed and the engine load), and extracts the ignition retarding amount at the operation point same as the current operation point from the stored values. Then, the ECU 100 calculates the ignition retarding amount at the current operation point by subtracting the unit advancing amount from the extracted value, and newly stores the calculated ignition retarding amount.

For example, when the engine is continuously operated at a certain operation point X, it is assumed that the ignition retarding amount at the same operation point X has already been identified as Z based on the detection history of the knock intensity up to one combustion cycle before, and the knock intensity detected at the current combustion cycle is the retard conducting knock intensity or below (i.e., it is determined as NO at Step S12). In this case, at Step S13, the unit advancing amount is subtracted from Z which is the previous ignition retarding amount (i−1), and the subtracted value is updated as a new ignition retarding amount (i) at the operation point X.

The unit of the ignition retarding amount and the unit advancing amount is the crank angle, and the unit advancing amount is a greater than 0, and is set and stored beforehand in the ECU 100.

On the other hand, if the determination at Step S12 is YES and the knock intensity is greater than the retard conducting knock intensity, the ECU 100 shifts to Step S14. At Step S14, the ECU 100 updates the ignition retarding amount (i) to a value obtained by adding the unit retarding amount to the ignition retarding amount (i−1) calculated previously at the same operation point.

For example, when the engine is continuously operated at the operation point X, it is assumed that the ignition retarding amount at the same operation point X has already been identified as W based on the detection history of the knock intensity up to one combustion cycle before, and the knock intensity detected in the current combustion cycle became greater than the retard conducting knock intensity (i.e., it is determined as YES at Step S12). In this case, at Step S14, the unit retarding amount is added to W which is the previous ignition retarding amount (i−1), and this added value is updated as a new ignition retarding amount (i) at the operation point X.

The unit of the unit retarding amount is also the crank angle. Moreover, the unit retarding amount is also greater than 0, and is set and stored beforehand in the ECU 100. However, in this embodiment, the unit retarding amount is set greater than the unit advancing amount.

Here, since the knock intensity is difficult to increase at the operation point where the engine load or the engine speed is comparatively low like the operation points P1, P2, and P3 of FIG. 3, the frequency of the knock intensity exceeding the retard conducting knock intensity (it is determined as YES at Step S12) is low. Therefore, in a range including the operation points P1, P2, and P3, and excluding the high-speed high-load range B-H (hereinafter, referred to as "other ranges"), the frequency of the ignition retarding amount (i) becoming greater than 0 is low, and the ignition timing is controlled in most cases to or near the basic ignition timing. On the other hand, at the operation point like the operation point P4 included in the high-speed high-load range B-H, where the engine speed and the engine load are high, since the knock intensity tends to become large, the frequency of the knock intensity exceeding the retard conducting knock intensity becomes greater than other ranges. Therefore, in the high-speed high-load range B-H, the frequency of the ignition retarding amount (i) becoming greater than 0 becomes relatively high, and the average retarding amount of the ignition timing with respect to the basic ignition timing tends to increase. When the average retarding amount increases to a non-negligible value, the maximum torque of the engine substantially falls.

After Steps S13 and S14, the ECU 100 shifts to Step S15. At Step S15, the ECU 100 determines the ignition timing based on the basic ignition timing set at Step S5 and the ignition retarding amount (i) set at Step S13 or S14, and ends this processing (it returns to Step S21).

In detail, when the ignition retarding amount (i) set at Step S13 or S14 is greater than 0, the ignition timing is set to a timing retarded from the basic ignition timing by the ignition retarding amount (i), and when the ignition retarding amount (i) set at Step S13 or S14 is less than 0, the ignition timing is set at a timing advanced from the basic ignition timing by the ignition retarding amount (i). When the ignition retarding amount (i) set at Step S13 or S14 is 0, the ignition timing is set as the basic ignition timing. That is, in this embodiment, when the knock intensity is greater than the retard conducting knock intensity, the retarding amount of the ignition timing from the basic ignition timing is increased by the unit retarding amount, and the ignition timing is retarded from the timing of one combustion cycle before (the ignition timing in the combustion cycle operated last time at the same operation point). On the other hand, when the knock intensity is the retard conducting knock intensity or less, the retarding amount of the ignition timing from the basic ignition timing is reduced by the unit advancing amount, and the ignition timing is advanced from the timing of one combustion cycle before (the ignition timing in the combustion cycle operated last time at the same operation point).

Figure 13:
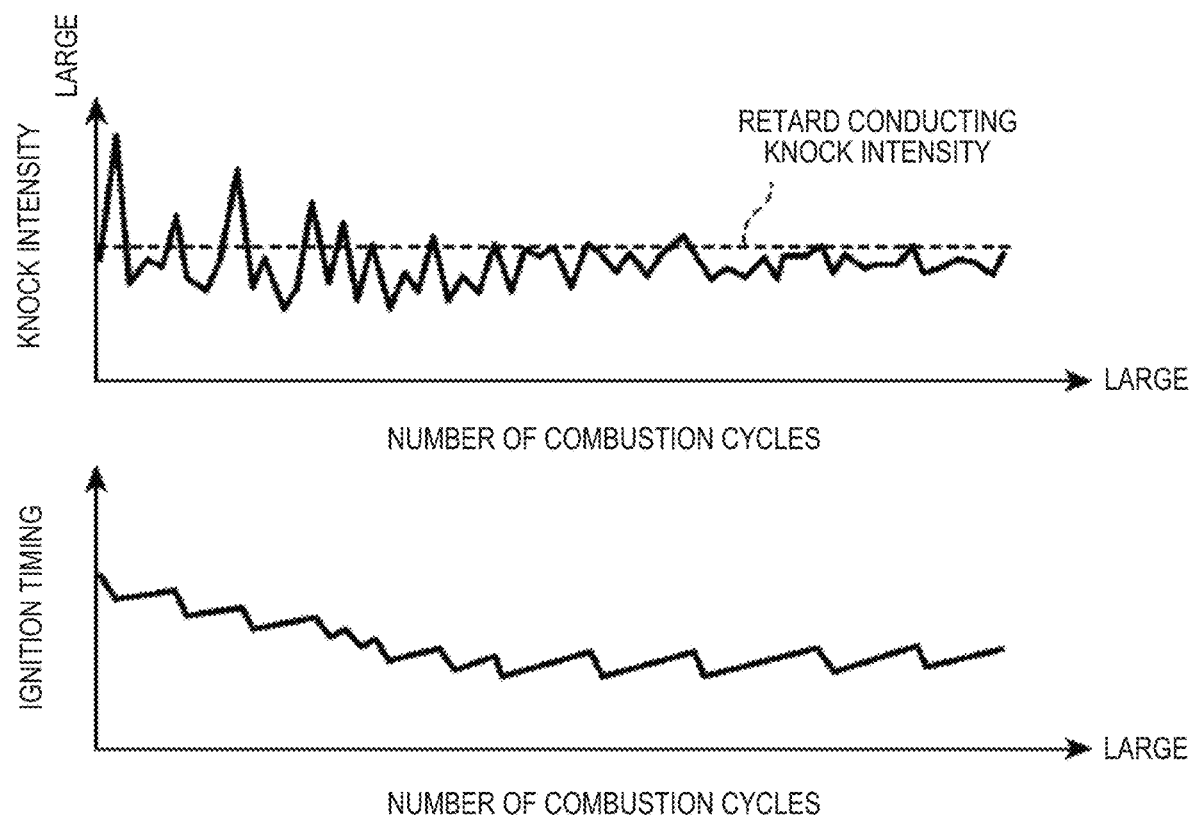
FIG. 13 is a view illustrating a control result of the ignition timing.

Note that as described above, since the unit advancing amount is set to a value less than the unit retarding amount, the ignition timing is greatly retarded when the knock intensity exceeds the retard conducting knock intensity, and, after that, the ignition timing is only gradually advanced, even if the knock intensity falls below the retard conducting knock intensity. Thus, like FIG. 13 which schematically illustrates the relation between the number of combustion cycles, the knock intensity, and the ignition timing, the ignition timing is retarded more each time the knock intensity exceeds the retard conducting knock intensity, and the ignition timing is controlled near the most advanced timing within a range where the knock intensity does not exceed the retard conducting knock intensity, with progress of time.

Figure 14:
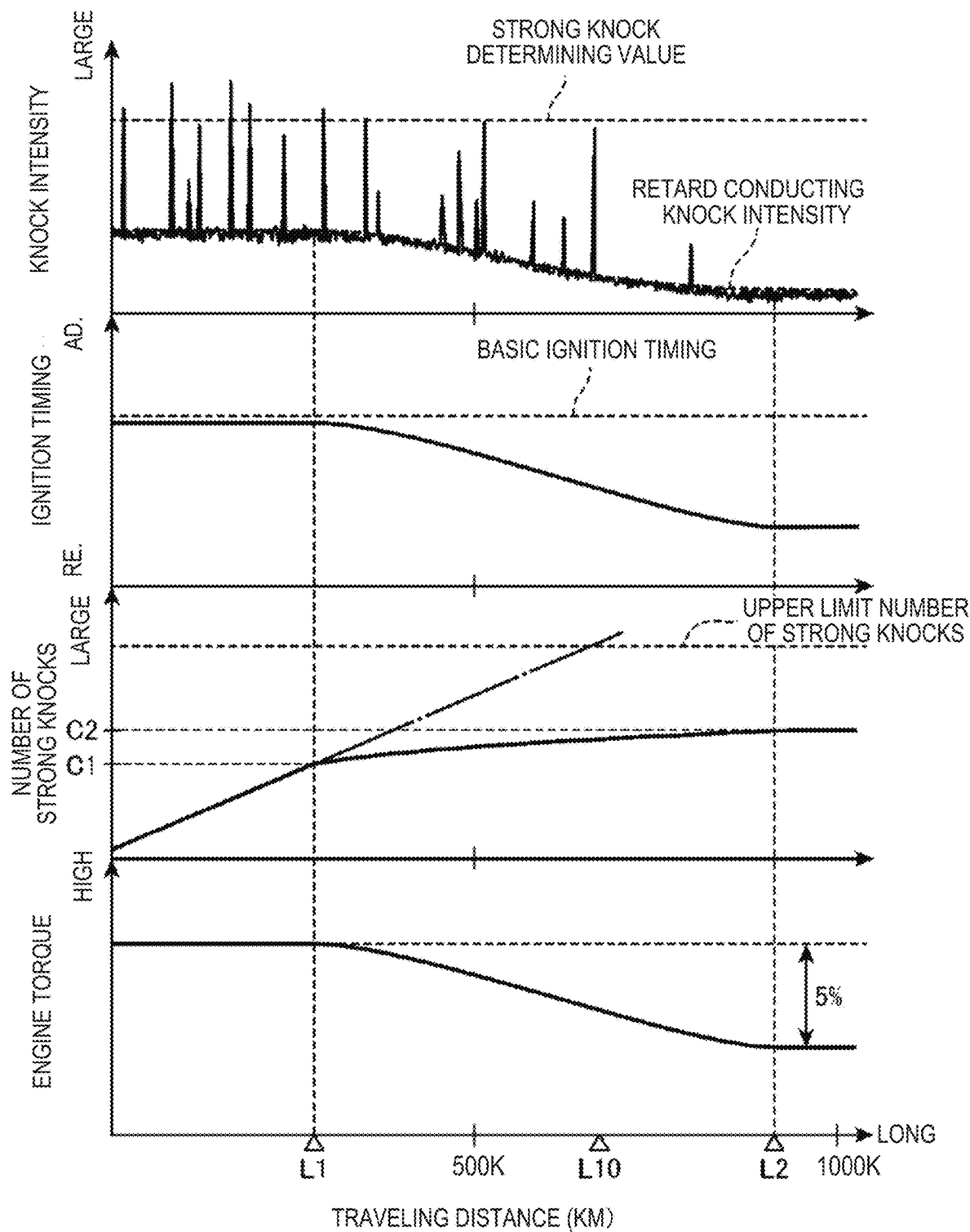
FIG. 14 is a view illustrating operation of a first embodiment.

Operation when the ignition timing is controlled is described with reference to FIG. 14. Each graph of FIG. 14 schematically illustrates a change in each parameter with respect to a traveling distance of the vehicle, in the order of the knock intensity, the ignition timing, the number of strong knocks, and the engine torque, from the top. Moreover, FIG. 14 illustrates the changes when operating the engine continuously in the high-speed high-load range B-H, and the engine torque of FIG. 14 is the maximum torque of the engine. Moreover, in the graph of the knock intensity, a broken line indicates the strong knock determining value, and in the graph of the ignition timing, a broken line indicates the basic ignition timing. Moreover, in the graph of the number of strong knocks, a one-dot chain line is a comparative example where a retard determining value is fixed to a first reference determining value, regardless of the number of strong knocks.

When the number of strong knocks is the first determination number C1 or less and the traveling distance is a distance L1 or less, the retard conducting knock intensity is set to the first reference intensity which is a comparatively high value. Therefore, the retarding amount of the ignition timing from the basic ignition timing is kept comparatively small, and thus, the high maximum torque of the engine is maintained. Since the strong knock determining value is greater than the first reference intensity, when the number of strong knocks reaches the first determination number C1 at the traveling distance L1, the number of times the knock intensity exceeded the first reference intensity by that time (less than the distance L1) is at least more than C1, and, therefore, the ignition timing has been retarded more than C1. However, the first reference intensity is sufficiently greater than the second reference intensity. Therefore, since the frequency of exceeding the first reference intensity (frequency of retarding the ignition timing) is not so often, the reducing amount of the maximum torque of the engine can be kept small.

On the other hand, when the number of strong knocks becomes greater than the first determination number C1 (when the traveling distance exceeds the distance L1), the retard conducting knock intensity is set to a value less than the first reference intensity. In this embodiment, as described above, the retard conducting knock intensity is reduced proportional to the number of strong knocks until the number of strong knocks becomes greater than the second determination number C2. The average retarding amount of the ignition timing increases as the retard conducting knock intensity is reduced. Therefore, the knock intensity is reduced, and thus, the opportunity for the knock intensity to exceed the strong knock determining value is also reduced. Moreover, the maximum torque of the engine is reduced as the retarding amount of the ignition timing is increased. That is, in this embodiment, when the number of strong knocks becomes greater than the first determination number C1, the maximum torque of the engine falls below compared to when the number of strong knocks is the first determination number C1 or less.

Further, the retard conducting knock intensity is set to the second reference intensity in connection with the number of strong knocks becoming greater than the second determination number C2. Thus, the opportunity for the knock intensity exceeding the strong knock determining value are mostly eliminated, and the number of strong knocks is maintained at a value lower than an upper limit number of strong knocks. By the number of strong knocks being maintained at the value lower than the upper limit number of strong knocks, the amount of corrosion of the cylinder block 3 will not reach the upper limit amount of corrosion, and therefore, leaking combustion gas to the outside of the combustion chamber 6 accompanying the corrosion of the cylinder block 3 can be avoided. That is, in the comparative example illustrated by the one-dot chain line, the number of strong knocks reaches the upper limit number of strong knocks near the traveling distance L2, and the amount of corrosion of the cylinder block 3 reaches the upper limit amount of corrosion to cause the leak of the combustion gas. On the other hand, in this embodiment, leaking combustion gas can be avoided even when the traveling distance exceeds the distance L2.

Note that the number of strong knocks becomes greater than the first determination number C1, for example, when the traveling distance becomes about 250,000 km. Moreover, the maximum torque of the engine when the number of strong knocks becomes the second determination number C2 is reduced to about 95% of the maximum torque of the engine when the number of strong knocks is the first determination number C1 (see broken line in engine torque graph in FIG. 14) or less.

As described above, in this embodiment, when the number of strong knocks is the first determination number C1 or less, the retard conducting knock intensity is set to the comparatively low first reference intensity, and when the knock intensity becomes greater than this first reference intensity, the ignition timing is retarded to reduce the knock intensity. The control which is carried out when this number of strong knocks is the first determination number C1 or less is an example of a "first control" of the present disclosure. Further, the retard conducting knock intensity when the number of strong knocks is the first determination number C1 or less (i.e., the first reference intensity) is an example a "first determination intensity" of the present disclosure when executing the first control.

Further, in this embodiment, when the number of strong knocks is greater than the first determination number C1, the retard conducting knock intensity is set to a value lower than the first reference intensity (the value lower than the first reference intensity, and the second reference intensity or greater), and the ignition timing is retarded when the knock intensity becomes greater than the retard conducting knock intensity lower than this first reference intensity. Moreover, the retarding amount of the ignition timing is increased more than when the number of strong knocks is the first determination number C1 or less to reduce the maximum torque of the engine. The control executed when this number of strong knocks is greater than the first determination number C1 is an example a "second control" of the present disclosure. Further, the retard conducting knock intensity when the number of strong knocks is greater than the first determination number C1 (i.e., the value set to this retard conducting knock intensity, which is lower than the first reference intensity and the second reference intensity or greater) is example of a "third determination intensity" of the present disclosure when executing the second control. Moreover, the ignition plug 13 is one example of an "output adjustment mechanism" of the present disclosure. (Operation, etc.)

As described above, in this embodiment, in the case where the number of strong knocks is the first determination number C1 or less, the ignition timing is retarded when the knock intensity becomes greater than the first reference intensity to reduce the knock intensity to near the first reference intensity. Therefore, noise becoming greater than a given value can be prevented. Moreover, when the number of strong knocks becomes greater than the first determination number C1, the ignition timing is retarded more than when the number of strong knocks is the first determination number C1 or less to reduce the maximum torque of the engine. Thus, the opportunity for the knock intensity becoming the strong knock determining value or greater in the state where the degradation of the engine body 1 has been progressed can be kept low, and the degradation of the engine body 1 can be prevented from progressing further. That is, a period until the suitable operation of the engine body becomes difficult can be extended. Moreover, when the number of strong knocks is the first determination number C1 or less and the degradation of the engine body 1 is seldom progressed, the retarding amount of the ignition timing can be kept small to secure the high engine torque.

In particular, in this embodiment, with the simple configuration for retarding the ignition timing, the reduction of the knock intensity and the reduction of the engine torque, and as a result, the prevention of noise increase and the degradation control of the engine body 1 can be achieved.

Moreover, in this embodiment, until the number of strong knocks becomes the second determination number C2 from the first determination number C1, the retard conducting knock intensity is reduced proportional to the number of strong knocks. Therefore, it is avoidable that the retarding amount of the ignition timing increases rapidly with the increase of the number of strong knocks to rapidly decrease the maximum torque of the engine, and the maximum torque of the engine can be reduced appropriately according to the degraded condition of the engine body 1.

Moreover, in this embodiment, when the number of strong knocks becomes greater than the second determination number C2, the retard conducting knock intensity is maintained at the second reference intensity which is the minimum value thereof, regardless of the number of strong knocks. Therefore, the retarding amount of the ignition timing becoming excessively large can be avoided, and the maximum torque of the engine becoming excessively small can be avoided.

(6) Second Embodiment

Next, a control device for an engine according to a second embodiment of the present disclosure is described. Unlike the engine system of the first embodiment, an engine system of the second embodiment does not have the ignition plug 13, but in other respects, it has a substantially similar configuration, and therefore, description of the details of the configuration of the engine system of the second embodiment is omitted. As described above, in the first embodiment, combustion is started by the ignition of the ignition plug 13 in all the operating ranges. On the other hand, in the second embodiment, the mixture gas starts combustion by a self-ignition in all the operating ranges. That is, in the second embodiment, CI combustion is carried out in all the operating ranges. In the second embodiment, since the ignition is not performed by the ignition plug 13, the fuel injected from the injector 14 is adjusted in order to reduce the knock intensity.

Figure 15:
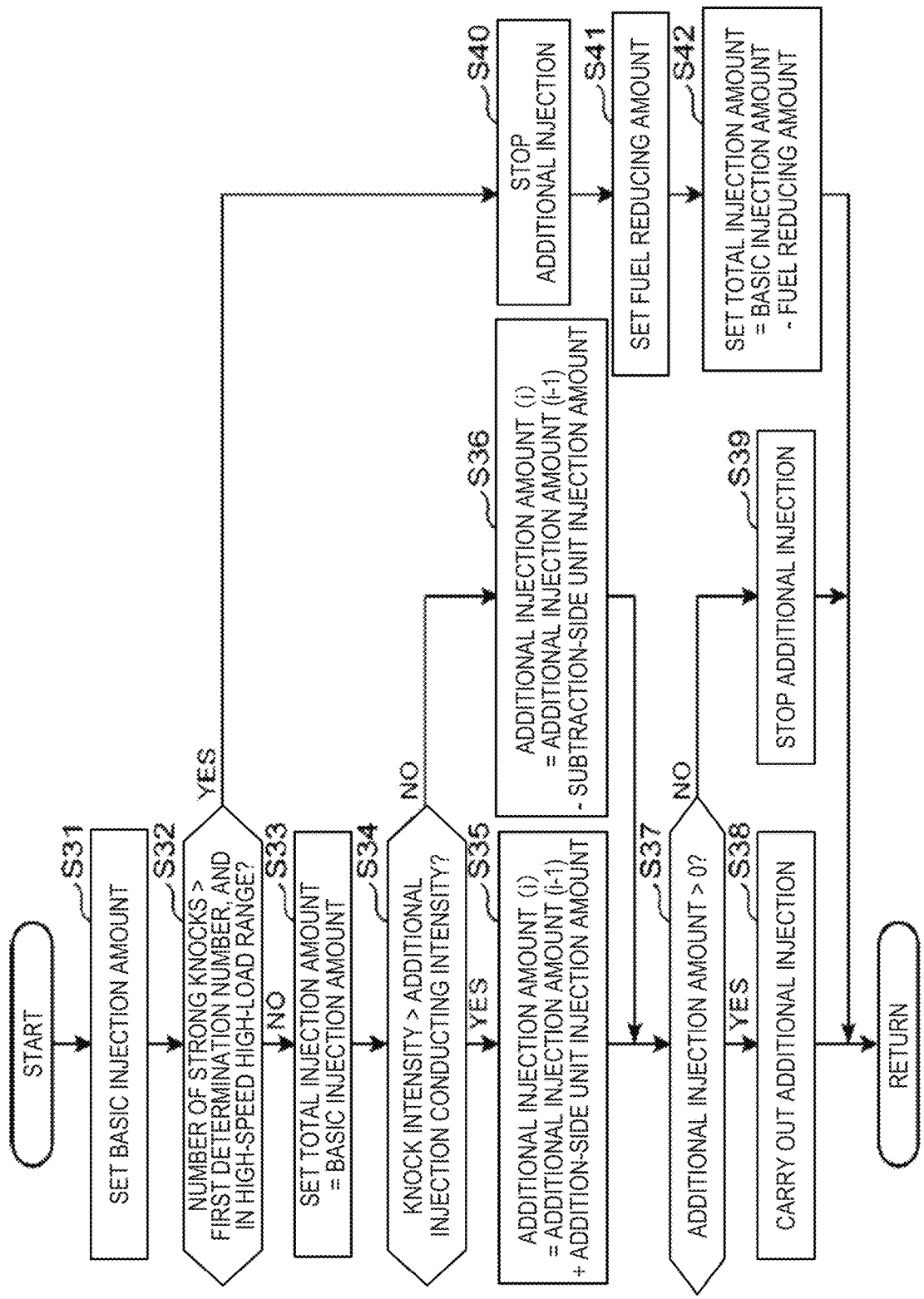
FIG. 15 is a flowchart illustrating a control procedure of a second embodiment.

A control of the fuel injection according to the second embodiment is described with reference to a flowchart of FIG. 15.

Figure 10:
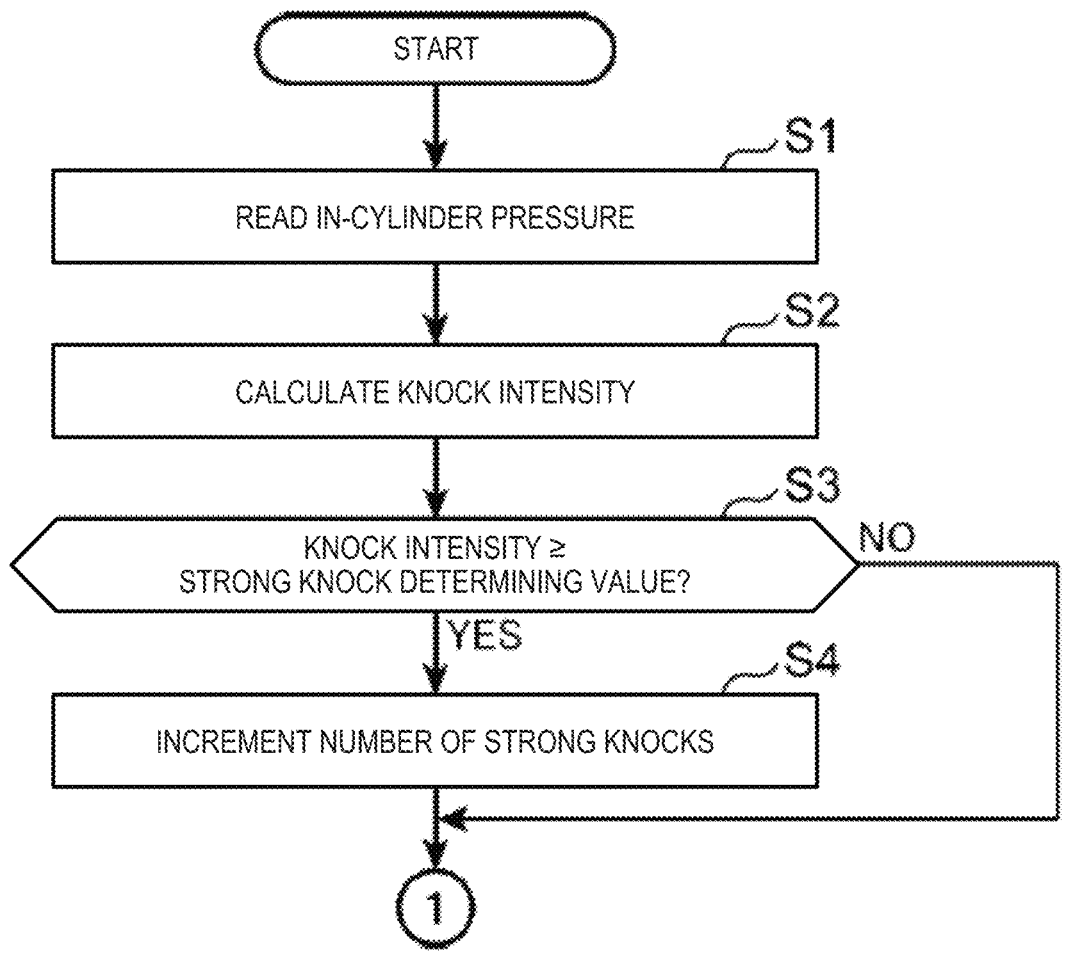
FIG. 10 is a flowchart illustrating an estimating procedure of a degree of degradation of the engine body.
Figure 11:
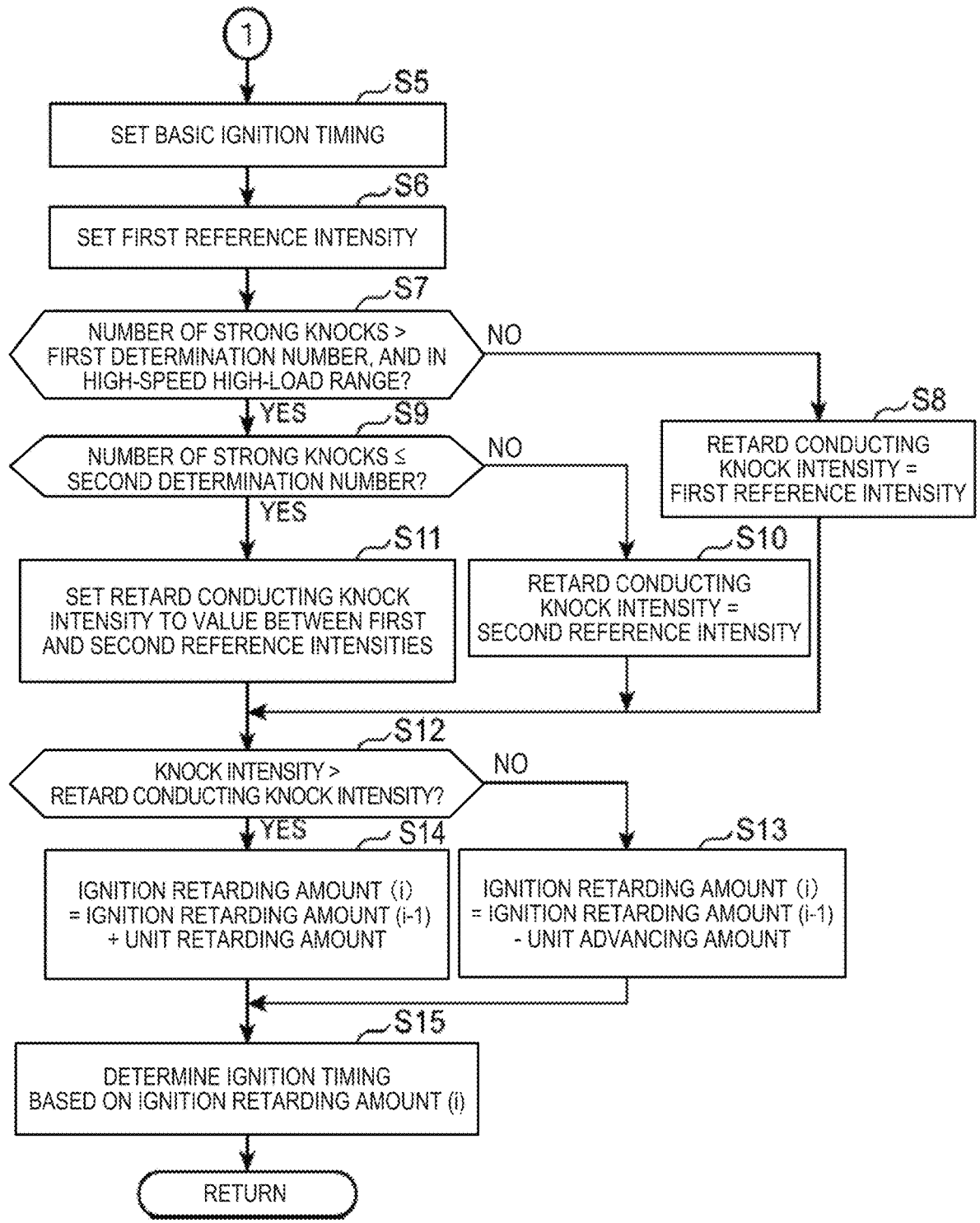
FIG. 11 is a flowchart illustrating a control procedure of an ignition timing.

Also in the second embodiment, Steps S1-S4 illustrated in the flowchart of FIG. 10 are executed. On the other hand, in the second embodiment, the ECU 100 shifts, after Step S4, to Step S31 illustrated in the flowchart of FIG. 15.

At Step S31, the ECU 100 sets a basic injection amount. The basic injection amount is a basic value of the total amount of fuel injected from the injector 14 into the combustion chamber 6 in one combustion cycle. The basic injection amount is the minimum amount of fuel required for outputting the torque demanded for the engine body 1, and the ECU 100 calculates the basic injection amount based on a filling efficiency of the combustion chamber 6, the engine speed, etc. Note that the filling efficiency is calculated based on the detection value of the airflow sensor SN2, etc., and the ECU 100 changes the opening of the throttle valve 22, etc. so that the filling efficiency becomes the minimum value required for outputting the torque demanded for the engine body 1.

Next, at Step S32, the ECU 100 determines whether a condition of the number of strong knocks being greater than the first determination number C1 and the engine being operated in the high-speed high-load range B-H is satisfied. The first determination number C1 is set beforehand and stored in the ECU 100. This determination number is set to the same value as the first determination number C1 of the first embodiment (for example, 800 or more and 1200 or less).

If the determination at Step S32 is NO, and the engine is operated in a range other than the high-speed high-load range B-H or the number of strong knocks is the first determination number C1 or less, the ECU 100 shifts to Step S33.

At Step S33, the ECU 100 sets the total injection amount to the basic injection amount set at Step S31. The total injection amount is the amount of fuel injected from the injector 14 in one combustion cycle (i.e., the total amount of injection). Note that when carrying out an additional injection described later, it is the total amount of injection excluding the amount of fuel injected from the injector 14 by the additional injection. After Step S33, the ECU 100 shifts to Step S34.

At Step S34, the ECU 100 determines whether the knock intensity is greater than an additional injection conducting intensity set beforehand. The additional injection conducting intensity is set and stored beforehand in the ECU 100. The additional injection conducting intensity is set to the maximum value of the knock intensity at which noise emitted from the engine body 1 can be kept below the given level, similar to the first reference intensity of the first embodiment. For example, the additional injection conducting intensity is set to a value of 10 bar or greater and 30 bar or lower. Also in the second embodiment, different additional injection conducting intensities are set corresponding to the engine speed and the engine load and stored in the ECU 100. At Step S34, a value corresponding to the current engine speed and engine load is extracted and is set as the additional injection conducting intensity.

If the determination at Step S34 is YES and the knock intensity is greater than the additional injection conducting intensity, the ECU 100 shifts to Step S35. At Step S35, the ECU 100 updates the additional injection amount (i) to a value obtained by adding an addition-side unit injection amount to an additional injection amount (i−1) previously calculated at the same operation point. In detail, in this embodiment, Steps S1-S39 are carried out for every combustion cycle. The ECU 100 stores the additional injection amount for each operation point (corresponding to the engine speed and the engine load), and extracts the additional injection amount at the same operation point as the current operation point from the stored values. Then, the addition-side unit injection amount is added to this extracted value to calculate the additional injection amount at the current operation point, and the calculated additional injection amount is newly stored. For example, when the engine is continuously operated at the same operation point, the addition-side unit injection amount is added to the additional injection amount (i−1) of one combustion cycle before, and the added value is set as a new additional injection amount (i).

On the other hand, if the determination at Step S34 is NO and the knock intensity is the additional injection conducting intensity or less, the ECU 100 shifts to Step S36. At Step S36, the ECU 100 updates the additional injection amount (i) to a value obtained by subtracting a subtraction-side unit injection amount from the additional injection amount (i−1) calculated previously at the same operation point. In this embodiment, the subtraction-side unit injection amount is a value greater than 0 (zero) and less than the addition-side unit injection amount, and is set and stored beforehand in the ECU 100.

After Steps S35 and S36, the ECU 100 shifts to Step S37. At Step S37, the ECU 100 determines whether the additional injection amount set at Step S35 or 36 is greater than 0. If the determination at Step S37 is YES and the set additional injection amount is greater than 0, the ECU 100 shifts to Step S38. Then, at Step S38, the ECU 100 carries out the additional injection. On the other hand, if the determination at Step S37 is NO and the set additional injection is 0 or less, the ECU 100 shifts to Step S39 where the additional injection is stopped.

Figure 16:
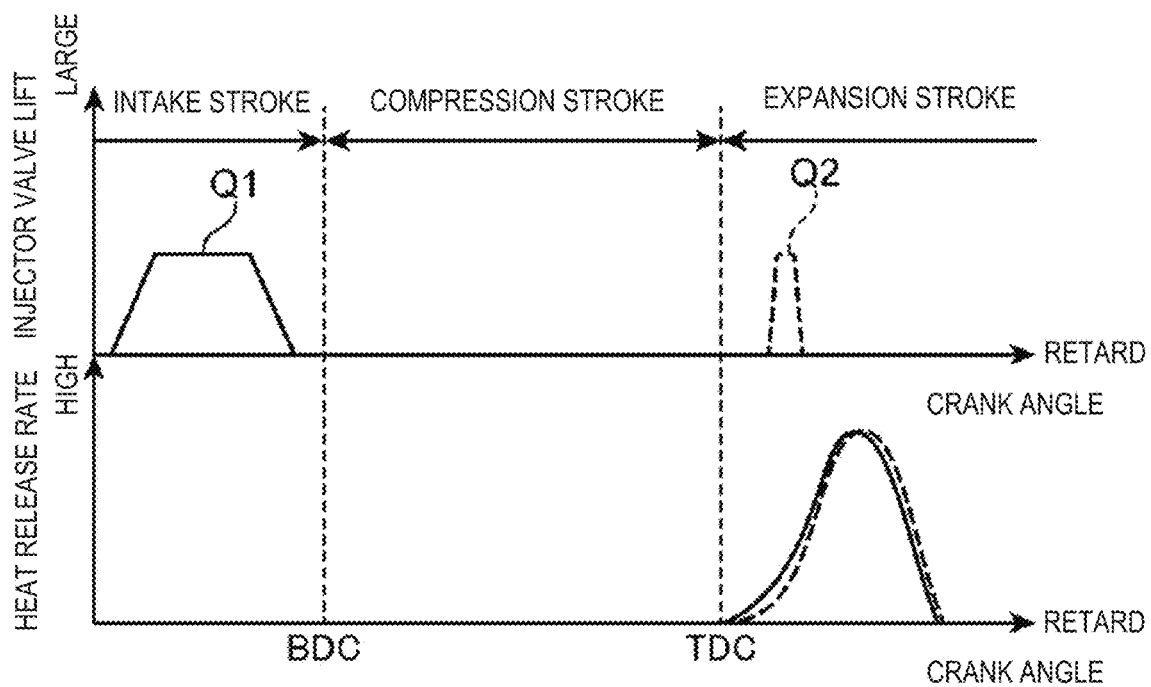
FIG. 16 is a view illustrating an injection pattern and a rate of heat release according to the second embodiment.

The additional injection is a fuel injection carried out during a period after a fuel injection carried out during the normal control (the number of strong knocks is the first determination number C1 or less and the knock intensity is the additional injection conducting intensity or less), and a period from the second half of the compression stroke to the first half of the expansion stroke. That is, the injector 14 is capable of carrying out the additional injection in which fuel is injected in the second half of the compression stroke or the first half of the expansion stroke, and the main injection in which fuel is injected before the additional injection. Then, during the normal control, the ECU 100 injects from the injector 14 only the total injection amount of fuel which is set at Step S33 in one combustion cycle. On the other hand, while executing the additional injection, the ECU 100 injects the total injection amount of fuel set at Step S33, and then, further injects from the injector 14 fuel in the second half of a compression stroke or in the first half of an expansion stroke. For example, like FIG. 16 schematically illustrating changes in an injection pattern (a valve lift of the injector 14) and a rate of heat release with respect to the crank angle, during the normal control, a main injection Q1 is carried out all at once in an intake stroke (the total injection amount of fuel is injected into the combustion chamber 6 at once in the intake stroke). Then, when the additional injection is carried out, an additional injection Q2 is carried out in the first half of the expansion stroke in addition to the main injection Q1. Note that the main injection Q1 may be dividedly carried out in a plurality of steps. That is, the total injection amount of fuel may be dividedly injected into the combustion chamber 6 from the injector 14 in a plurality of steps. Note that the period from the second half of the compression stroke to the first half of the expansion stroke means a period from 90° CA (crank angle) before the compression top dead center to 90° CA after the compression top dead center.

Moreover, at Step S38, the ECU 100 controls the injector 14 so that the amount of fuel injected by the additional injection from the injector 14 becomes the additional injection amount set at Step S35 or S36.

Thus, in the second embodiment, if the number of strong knocks is the first determination number or less, or if the engine is not operated in the high-speed high-load range B-H, the additional injection is carried out when the knock intensity is greater than the additional injection conducting intensity, and the additional injection is fundamentally suspended when the knock intensity is the additional injection conducting intensity or less. In detail, as described above, the subtraction-side additional injection amount is set to a value less than the addition-side additional injection amount. Therefore, when the knock intensity becomes greater than the additional injection conducting intensity and the additional injection is once carried out, the injection amount of the additional injection is then only reduced gradually even when the knock intensity becomes the additional injection conducting intensity or below and, thus, the additional injection is continuously carried out. Then, when the combustion cycle in which the knock intensity becomes the additional injection conducting intensity or below continues for a given number of cycles, the additional injection is suspended in response to the additional injection amount becoming 0 or less.

Thus, when the fuel is additionally injected into the combustion chamber 6 at the timing in the second half of the compression stroke or the first half of the expansion stroke, where the temperature inside the combustion chamber 6 becomes high, the latent heat of vaporization caused by the fuel of the additional injection reduces the increase in temperature inside the combustion chamber 6, thereby slowing down the combustion and preventing the increase in the in-cylinder pressure. For example, while the rate of heat release becomes as illustrated by a solid line in FIG. 16 when not carrying out the additional injection, it becomes as illustrated by a broken line in FIG. 16 when the additional injection is carried out. Thus, according to the second embodiment since the additional injection is carried out in response to the knock intensity becoming greater than the additional injection conducting intensity, the knock intensity is reduced, and the knock intensity is controlled averagely near the additional injection conducting intensity.

Returning to FIG. 15, if the determination at Step S32 is NO, the number of strong knocks is greater than the first determination number C1, and the engine is operated in the high-speed high-load range B-H, the ECU 100 shifts to Step S40.

Figure 17:
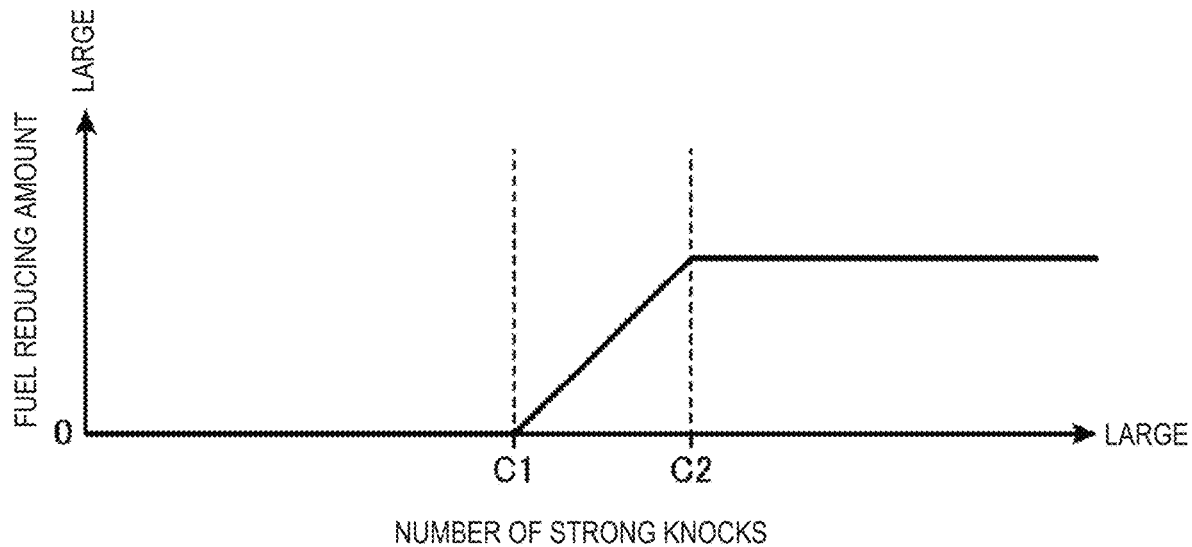
FIG. 17 is a view illustrating a relationship between the number of strong knocks and a fuel reducing amount.

At Step S40, the ECU 100 suspends the additional injection (the suspension of the additional injection is continued, if the additional injection is not carried out). After Step S40, the ECU 100 shifts to Step S41. At Step S41, the ECU 100 sets a fuel reducing amount. After Step S41 the ECU 100 shifts to Step S42. At Step S42, the total injection amount is set to a value obtained by subtracting the fuel reducing amount set at Step S41 from the basic injection amount set at Step S31. Then, the ECU 100 controls the injector 14 so that the total amount of fuel injected into the combustion chamber 6 in one combustion cycle becomes the total injection amount set at Step S42. That is, the fuel reducing amount is a reducing amount of the basic injection amount of the total amount of fuel injected into the combustion chamber 6 in one combustion cycle. The fuel reducing amount is set and stored beforehand in the ECU 100. In this embodiment, the fuel reducing amount is set as illustrated in FIG. 17. In detail, when the number of strong knocks becomes greater than the first determination number C1, the fuel reducing amount is increased proportionally to the number of strong knocks, and when the number of strong knocks becomes greater than the given second determination number C2, the fuel reducing amount is maintained at a fixed value, regardless of the number of strong knocks. The second determination number C2 is a value greater than the determination number, and is stored beforehand in the ECU 100. The second determination number C2 is, for example, set to a value about 300 greater than the determination number, similar to the second determination number C2 of the first embodiment.

Figure 18:
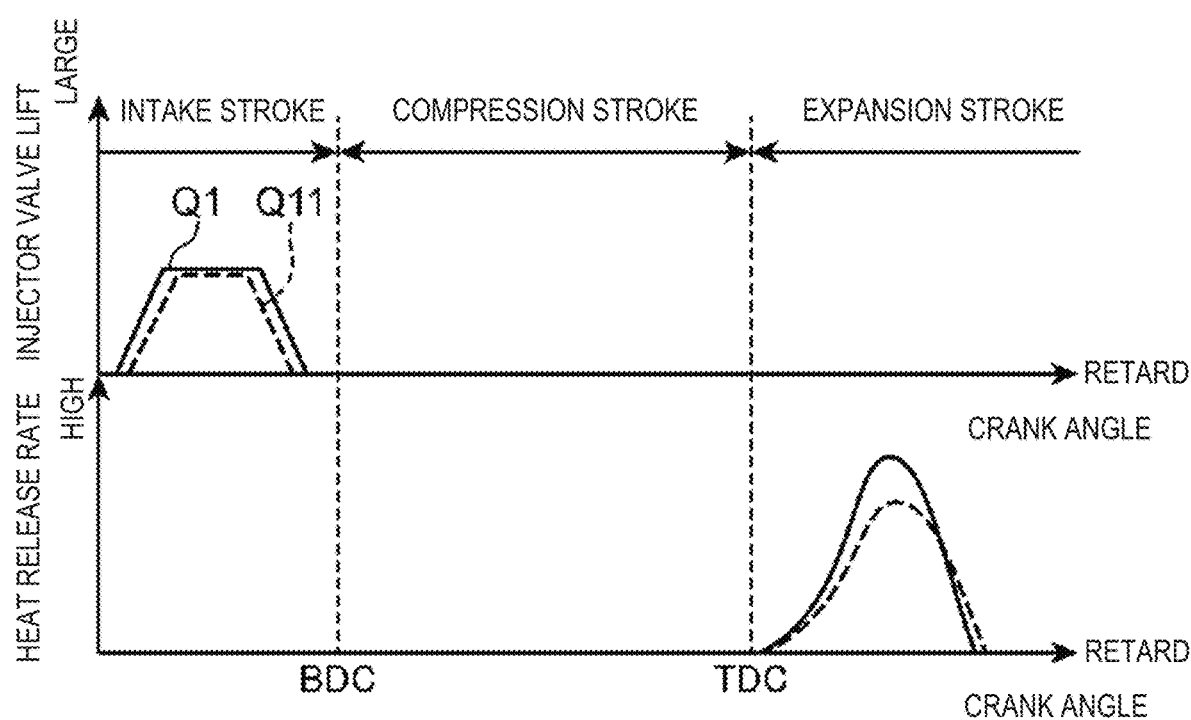
FIG. 18 is a view illustrating the injection pattern and the rate of heat release according to the second embodiment.

Thus, when the number of strong knocks is greater than the first determination number C1, the total amount of fuel injected into the combustion chamber 6 in one combustion cycle is made less than the basic injection amount, i.e., the amount when the number of strong knocks is the first determination number C1 or less. For example, as illustrated in FIG. 18, when all the fuel to be injected into the combustion chamber 6 in one combustion cycle is injected all at once in the intake stroke, the amount of injection carried out in this intake stroke is reduced from the basic injection amount Q1 illustrated by the solid line to a total injection amount Q11 illustrated by a broken line. By the total injection amount being reduced, the heat release becomes slow because the rate of heat release becomes as illustrated by the broken line in FIG. 18 from the state illustrated by the solid line. Note that when the fuel is injected in a plurality of steps in one combustion cycle, the largest amount of injection is reduced by the fuel reducing amount. Note that in this case, the amount of each injection may be reduced so that the total amount of reduction of each injection becomes the fuel reducing amount.

When the total amount of fuel injected into the combustion chamber 6 in one combustion cycle decreases, the engine torque also decreases. Thus, in the second embodiment, when the number of strong knocks becomes greater than the first determination number C1, the engine torque is reduced more than when the number of strong knocks is the first determination number C1 or less. In this embodiment, the reduction of the total injection amount is performed only in the high-speed high-load range B-H, and therefore, when the number of strong knocks is greater than the first determination number C1, the maximum torque of the engine is reduced more than when the number of strong knocks is the first determination number C1 or less.

Here, in the second embodiment, as described above, when the number of strong knocks is the first determination number C1 or less, and the knock intensity exceeds the additional injection conducting intensity, the additional injection is carried out, and this control for executing the additional injection is an example of the "first control" of the present disclosure, and the additional injection conducting intensity is an example of the "first determination intensity" of the present disclosure.

In the second embodiment, as described above, the control for reducing the total injection amount, which is carried out when the number of strong knocks is greater than the first determination number C1 is an example of the "second control" of the present disclosure, and the injector 14 is an example of the "output adjustment mechanism" of the present disclosure. (Operation, etc.)

As described above, also in the second embodiment, when the number of strong knocks is the first determination number C1 or less, and the knock intensity is greater than the additional injection conducting intensity, the additional injection is carried out to reduce the knock intensity, thereby noise is prevented from becoming greater than the given value. Moreover, when the number of strong knocks becomes greater than the first determination number C1, the total injection amount is reduced more than when the number of strong knocks is the first determination number C1 or less to reduce the maximum torque of the engine. Therefore, in the state where the degradation of the engine body 1 is progressed, the opportunity for the knock intensity becoming greater than the strong knock determining value can be kept low, thereby the degradation of the engine body 1 is prevented from progressing further. That is, the period until the suitable operation of the engine body becomes difficult can be extended. Moreover, when the number of strong knocks is the first determination number C1 or less and the degradation of the engine body 1 has been seldom progressed, the maximum torque of the engine falling can be avoided to secure the high engine torque.

(7) Other Modifications

In the first embodiment, only when the engine is operated in the high-speed high-load range B-H, Steps S9 and S10 are executed to reduce the retard conducting knock intensity more when the number of strong knocks is greater than the first determination number C1 than when the number of strong knocks is the first determination number C1 or less. However, the control for reducing the retard conducting knock intensity when the number of strong knocks becomes greater than the first determination number C1 may be executed when the engine is operated in other operating ranges. Moreover, in the second embodiment, only when the engine is operated in the high-speed high-load range B-H, Steps S40-S42 are executed to reduce the total injection amount. However, the reduction control of the total injection amount may also be executed when the engine is operated in other operating ranges.

However, when the engine is operated in the high-speed high-load range B-H, the knock intensity tends to exceed the strong knock determining value. Therefore, if the above control is executed only in the high-speed high-load range B-H, the control configuration can be simplified to reduce the operation load of the ECU 100.

Moreover, Steps S1-S4 for counting the number of times the knock intensity exceeds the strong knock determining value may be executed only in the range where the engine load is high and the knock intensity tends to exceed the strong knock determining value (for example, only in the high-speed high-load range B-H).

Moreover, the geometric compression ratio of the cylinder is not limited to 15:1 or higher and 20:1 or lower. However, when the geometric compression ratio of the cylinder becomes 15:1 or higher, the knock intensity tends to become high. Therefore, if the above embodiment is applied to this engine, the period until the amount of corrosion of the cylinder block 3 reaches the upper limit amount of corrosion can be effectively extended. Moreover, when the geometric compression ratio of the cylinder is 15:1 or higher, since the correlation of the number of times the knock intensity exceeded the strong knock determining value with the amount of corrosion of the cylinder block 3 is particularly high because the knock intensity tends to become high, if the above embodiment is applied to such an engine, the degree of degradation of the engine body 1 can be estimated with more sufficient accuracy.

Moreover, in the above embodiment, the maximum value of the amount of increase in the in-cylinder pressure caused by combustion is used as the knock intensity, and the number of times the maximum value of the amount of increase in the in-cylinder pressure exceeded the given value (strong knock determining value) is used as the number of strong knocks. The maximum value of the in-cylinder pressure in one combustion cycle may be used as the knock intensity, and the number of times the maximum value of the in-cylinder pressure exceeded a given value may be used as the number of strong knocks. Moreover, the retard conducting knock intensity is set based on the maximum value of the in-cylinder pressure, and the ignition timing may be adjusted and the determination of whether the additional injection is to be performed may be performed based on a comparison of the maximum value of the in-cylinder pressure with the given value (retard conducting knock intensity). Moreover, the maximum value of a rate of change in the in-cylinder pressure in one combustion cycle may be used as the knock intensity, the number of times the maximum value of the rate of change in the in-cylinder pressure exceeded a given value may be used as the number of strong knocks, and the ignition timing may be adjusted and the determination of whether the additional injection is to be performed may be performed based on a comparison of the maximum value of the rate of change in the in-cylinder pressure with a given value (retard conducting knock intensity). Moreover, the knock intensity sensor which detects the knock intensity is not limited to the in-cylinder pressure sensor SN3. For example, a vibration sensor which detects vibration (e.g., amplitude) of the engine body 1 may be provided, and the maximum value of the detection value of the vibration sensor in one combustion cycle may be used as the knock intensity.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
6 Combustion Chamber
13 Ignition Plug (Output Adjustment mechanism of First Embodiment)
14 Injector (Output Adjustment mechanism of Second Embodiment)
100 ECU (Controller)
SN3 In-cylinder Pressure Sensor (Knock Intensity Sensor)

What is claimed is:

1. A control device for an engine configured to control the engine where a cylinder is formed, comprising:
    a knock intensity sensor configured to detect a knock intensity that is an intensity of knock caused inside the cylinder;
    an output adjustment mechanism configured to adjust an output torque of the engine; and
    a controller configured to control the output adjustment mechanism based on the knock intensity detected by the knock intensity sensor,
    wherein the controller executes a first control in which the output adjustment mechanism is controlled to reduce the knock intensity when the number of strong knocks, that is the number of times the knock intensity becomes a second determination intensity or greater which is greater than a given first determination intensity, is a given determination number or less and when the knock intensity is greater than the first determination intensity, and executes a second control in which the output adjustment mechanism is controlled to reduce a maximum torque of the engine more than when the number of strong knocks is the determination number or less, when the number of strong knocks is greater than the determination number.

2. The control device of claim 1, wherein the controller executes the second control only when the engine is operated in a high-speed high-load range in which an engine speed is a given reference speed or higher and the engine load is a given reference load or higher.

3. The control device of claim 1,
    wherein the output adjustment mechanism is an ignition plug configured to ignite a mixture gas inside the cylinder, provided to an engine body of the engine,
    wherein the first control is a control in which an ignition timing at which the mixture gas is ignited by the ignition plug is retarded when the knock intensity becomes greater than the first determination intensity, and the ignition timing is advanced when the knock intensity becomes less than the first determination intensity, and
    wherein the second control is a control in which the ignition timing is retarded when the knock intensity becomes greater than a third determination intensity less than the first determination intensity, and the ignition timing is advanced when the knock intensity becomes less than the third determination intensity.

4. The control device of claim 3, wherein the controller gradually decreases the third determination intensity as the number of strong knocks increases during the execution of the second control.

5. The control device of claim 4,
    wherein the determination number is a first determination number, and
    wherein the controller maintains the third determination intensity at a minimum value regardless of the number of strong knocks, when the number of strong knocks becomes greater than a second determination number greater than the first determination number, during the execution of the second control.

6. The control device of claim 1,
    wherein the output adjustment mechanism is an injector configured to inject fuel into the cylinder, provided to an engine body of the engine,
    wherein the injector is capable of carrying out an additional injection in which fuel is injected during a period from the second half of a compression stroke to the first half of an expansion stroke, and a main injection in which fuel is injected before the additional injection,
    wherein the controller controls the injector so that the mixture gas combusts by self-ignition inside the cylinder,
    wherein the first control is a control in which both the main injection and the additional injection are carried out by the controller, and
    wherein the second control is a control in which the total amount of fuel injected into the cylinder in one combustion cycle is reduced by the controller more than when the number of strong knocks is the determination number or less.

7. The control device of claim 1, wherein the geometric compression ratio of an engine body of the engine is set to 15:1 or higher and 25:1 or lower.

8. The control device of claim 1, wherein the knock intensity sensor is an in-cylinder pressure sensor configured to detect a pressure inside the cylinder.

9. The control device of claim 1, wherein the knock intensity sensor is a vibration sensor configured to detect vibration of an engine body of the engine.

* * * * *